(12) United States Patent
Ohashi

(10) Patent No.: US 7,236,984 B2
(45) Date of Patent: Jun. 26, 2007

(54) DIGITAL DOCUMENT DISCUSSION APPARATUS AND DIGITAL DOCUMENT DISCUSSION METHOD

(75) Inventor: Tadashi Ohashi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 388 days.

(21) Appl. No.: 10/022,536

(22) Filed: Dec. 20, 2001

(65) Prior Publication Data
US 2003/0061208 A1 Mar. 27, 2003

(30) Foreign Application Priority Data
Sep. 21, 2001 (JP) ............................. 2001-290138

(51) Int. Cl.
*G06F 17/00* (2006.01)
(52) U.S. Cl. .................. 707/104.1; 707/101; 707/102; 707/103 R; 715/500.1; 715/501.1; 715/502
(58) Field of Classification Search ............. 707/1–10, 707/100–104.1, 200–206; 715/500–529
See application file for complete search history.

(56) References Cited

U.S. PATENT DOCUMENTS 6,178,430 B1 * 1/2001 Cohen et al. ............ 715/501.1
6,266,683 B1 * 7/2001 Yehuda et al. ............... 715/512
6,591,289 B1 * 7/2003 Britton ........................ 707/101
6,766,321 B2 * 7/2004 Sasaki et al. ................. 707/8

FOREIGN PATENT DOCUMENTS

JP 11-96248 4/1999
JP 2001-118012 4/2001

OTHER PUBLICATIONS

Open Middleware, Extended Workflow Solutions with New Products, Hitach, pp. 17 to 20, Jul. 1, 2001, Hitachi, Ltd.
Japanese Office Action dated Nov. 7, 2006, for corresponding Japanese Patent Application No. 2001-290138.

* cited by examiner

Primary Examiner—Isaac Woo
(74) Attorney, Agent, or Firm—Staas & Halsey LLP

(57) ABSTRACT

A digital document discussion apparatus includes a user profile information database storing user profile information on a user, a responsible organization profile information database storing responsible organization profile information, and a control section providing a template to a discussion requester by a frame with a work process, the user profile information and the responsible organization profile information corresponding to a digitized discussion document used as keys, allowing the discussion document to be created based on this template, and requesting the discussion participant to discuss the created discussion document.

4 Claims, 30 Drawing Sheets

DESIGN AND MANUFACTURING WORK PROCESS

| USER ID | ×××  |  |
|---|---|---|
| NAME | ××× |  |
| EMPLOYEE NUMBER | ××× |  |
| ORGANIZATION | ⋮ |  |
| EXECUTIVE POSITION | ⋮ |  |
| TELEPHONE NUMBER |  |  |
| E-MAIL ADDRESS |  |  |
| QUALIFICATION OBTAINED |  |  |
| RESPONSIBLE WORK |  |  |
| RESPONSIBLE MACHINE TYPE | ⋮ |  |
| RESPONSIBLE MODEL | ⋮ |  |
| RESPONSIBLE STANDARD | ××× |  |
| RESPONSIBLE DRAWING | ××× |  |
| RESPONSIBLE DOCUMENT | ××× |  |
|  |  |  |

| | | |
|---|---|---|
| COMPANY NAME | ××× | |
| HEADQUARTERS NAME | ××× | |
| DIVISION NAME | ××× | |
| DEPARTMENT NAME | ⋮ | |
| DEPARTMENT CHIEF NAME | ⋮ | |
| TELEPHONE NUMBER | | |
| E-MAIL ADDRESS | | |
| RESPONSIBLE WORK | ⋮ | |
| RESPONSIBLE MACHINE TYPE | ⋮ | |
| RESPONSIBLE STANDARD | ××× | |
| RESPONSIBLE DRAWING | ××× | |
| RESPONSIBLE DOCUMENT | ××× | |
| | | |

```
<?xml version= "1.0" encoding= "UTF-8" ?>
<!DOCTYPE Answer SYSTEM "../dtd/Answer.dtd" >
<AnswerList>
  <Answer id= "default" >
     <ReqEntCd>1068</ReqEntCd>
     <ReqEntNm>○○BUSINESS PLANNING ANALYSIS & ADMINISTRATION
     DEPARTMENT</ReqEntNm>
     <ReqSecCd>1434</ReqSecCd>
     <ReqSecNm>××MANAGEMENT DEPARTMENT</ReqSecNm>
     <ReqChargeCd>3168</ReqChargeCd>
     <ReqChargeNm>FUJITSU TARO</ReqChargeNm>
     <ReqPosit>LEADER</ReqPosit>
     <ReqMailAdd>fujitsu</ReqMailAdd>
     <Reply id= "1434" >
          <AnsYmd>2001. 3. 8</AnsYmd>
          <DelibNo>CN-123-0006</DelibNo>
          <DelibSubj>DISCUSSION OF WRITTEN DOCUMENT
            "DEVELOPED NAME REGISTRATION PROVISION" </DelibSubj>

<DelibNm>DEVELOPED NAME REGISTRATION PROVISION</DelibNm>
          <DelibConc>0</DelibConc>
          <ModifList>
                    <Modif>
                         <ModifPage>0</ModifPage>
                         <ModifPlace>default</ModifPlace>
                         <OrgBody>default</OrgBody>
                         <ModifCont>default</ModifCont>
                    </Modif>
          </ModifList>
          <AnsChargeCd>3168</AnsChargeCd>
          <AnsChargeNm>FUJITSU TARO</AnsChargeNm>
          <AnsPosit>default</AnsPosit>
          <AnsTel>71122</AnsTel>
          <AnsMailAdd>fujitsu@xxx.fujitsu.co.jp</AnsMailAdd>
     </Reply>
  </Answer>
</AnswerList>
```

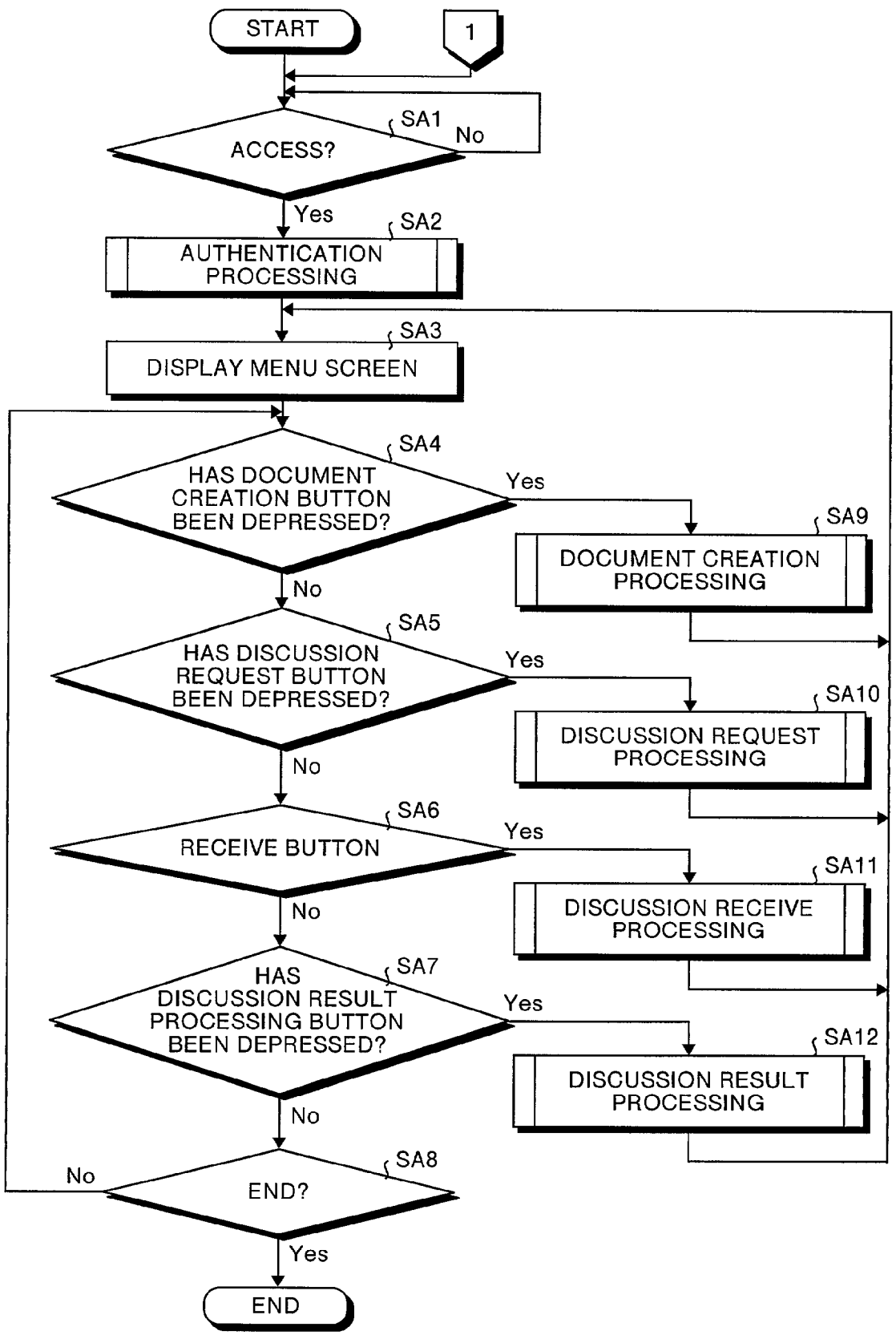

FIG.24

ENTER AUTHENTICATION INFORMATION

COMPANY ID ⬚ ~801

USER ID ⬚ ~802

PASSWORD ⬚ ~803

FIG.25

| DOCUMENT CREATION | ~811 |
| DISCUSSION REQUEST | ~812 |
| DISCUSSION RECEIVE | ~813 |
| DISCUSSION RESULT PROCESSING | ~814 |

FIG.30

「INPUTTED COMPANY ID IS NOT REGISTERED.」

FIG.31

「INPUTTED USER ID IS NOT REGISTERED.」

| COUNTER | PATTERN | PATTERN NAME |
|---|---|---|
| C0 | f0  f1  f2 | P0 |
| C1 | f0  f2  f1 | P1 |
| C2 | f1  f0  f2 | P2 |
| C3 | f1  f2  f0 | P3 |
| C4 | f2  f0  f1 | P4 |
| C5 | f2  f1  f0 | P5 |

FIG.36
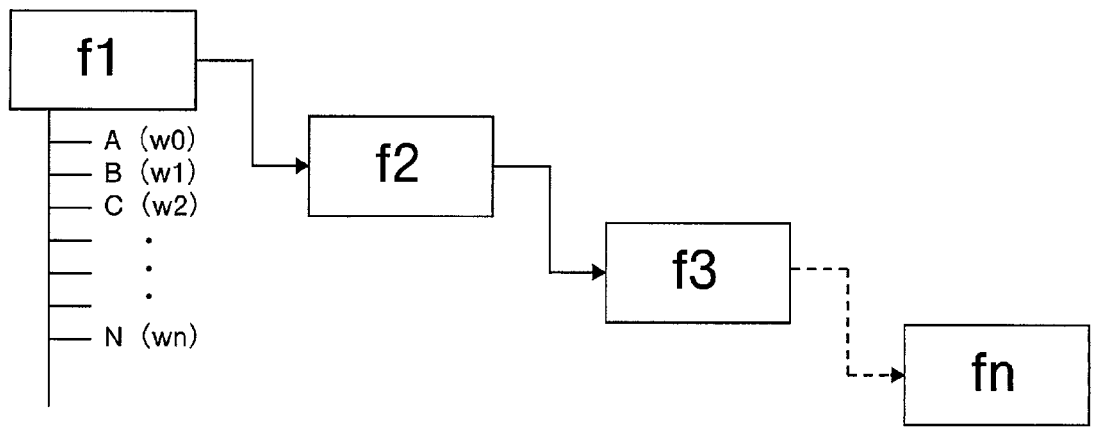
FIG.37
| COMPANY NAME | DEPARTMENT NAME | DEPARTMENT CHIEF NAME | E-MAIL ADDRESS |
|---|---|---|---|
| ×××  | ×××  | ×××  | ×××  |
900
FIG.38
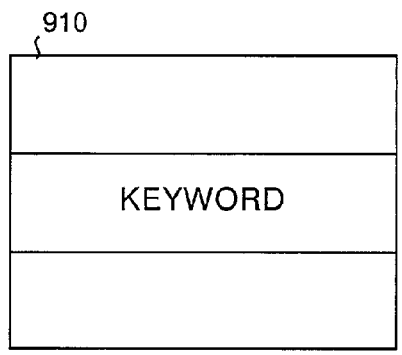

DIGITAL DOCUMENT DISCUSSION APPARATUS AND DIGITAL DOCUMENT DISCUSSION METHOD

FIELD OF THE INVENTION

The present invention relates to a digital document discussion apparatus and a digital document discussion method for realizing the discussion of a digital document in a company or the like by a client server system, and particularly relates to a digital document discussion apparatus and a digital document discussion method allowing operations related to discussion to be promptly carried out.

BACKGROUND OF THE INVENTION

Conventionally, discussion request written documents on which various types of projects, in-company rules or the like are written are distributed on a paper base to relevant departments, customers and the like and the contents of the discussion request written documents are discussed when establishing or revising the various projects, in-company rules or the like. Conventionally, however, a discussion request document is distributed on a paper base, it takes considerable labor and cost to copy the document, manage distribution parties, manage the collection and accumulation of discussion results, send reminders when the results are not collected and the like. Accordingly, units and methods capable of effectively solving these disadvantages have been long desired.

As stated above, in a company, every work is performed through the discussion of a written document. To be specific, as shown in FIG. 41, a discussion requester in a discussion request department creates an original on which design and manufacture rules (standards, drawings or documents) to be discussed are described, creates copies of a set of the original by the number of discussion commitment departments as a discussion request document and puts each copy in an envelope.

Next, the discussion requester writes distribution information (department, mail address, discussion participant, organization of company) on each of the plural envelopes, and distributes a set of the discussion request document to each of the discussion commitment departments using an in-company mail system. Here, the distribution information is updated based on an organization list published by an organization management department whenever personnel changes or organization changes occur.

When the discussion request document is distributed to respective discussion participants, the participants discuss the discussion request document. At this moment, if necessary, the discussion participants obtain a material (materials) necessary for a discussion and holds the discussion while referring to the material (materials). Then, the discussion participants send paper-base discussion results as replies (approval, disapproval or change) to the discussion requester using the mail system.

The discussion requester collects the discussion results from the plural discussion participants on a paper base. If all the discussion results cannot be collected even after a predetermined reply deadline, the discussion requester reminds the discussion participants of the replies over the telephone or the like. When all the discussion results are collected, the discussion results are accumulated and the accumulation result is reflected in the original of the design and manufacture rules (standards, drawings or documents).

Meanwhile, as described above, the distribution of a discussion request document and the collection of discussion result replies have been conventionally on a paper base, it disadvantageously requires a considerable amount of paper as a whole and it is disadvantageously difficult to promptly perform a series of document discussion operations including a distribution operation, a collection operation and an accumulation operation.

Further, it has been conventionally necessary to accurately reflect changes of the departments to which distribution parties (discussion participants) belong, organization and the like in distribution party information following personnel changes or organization changes. It can be easily imagined that much labor and cost are required to, for example, manage the distribution information. This disadvantage is particularly conspicuous in a company having frequent personnel changes and organization changes.

SUMMARY OF THE INVENTION

It is an object of the present invention to provide a digital document discussion apparatus and a digital document discussion method capable of performing operations related to the discussion of a written document.

A according to one aspect of the present invention, there is provided a digital document discussion apparatus comprising, a discussion document storage unit which stores a digitized document in a discussion document database, an attribute information storage unit which stores attribute information on a user as an attribute information database, a template providing unit which provides a templates to a discussion requester as the user by a frame with a work process and the attribute information corresponding to the discussion document used as keys, a discussion document creation unit which creates the discussion document based on the template, and a discussion request unit which requests a discussion participant as the user to discuss the discussion document created by the discussion document creation unit.

Further, the template is provided to the discussion requester by the frame with the work process and the attribute information corresponding to the discussion document used as keys, and the discussion document for which a request is issued is created based on this template. Due to this, it is possible to promptly create the discussion document and to issue the request to correspond to the work process.

According to another aspect of the present invention, there is provided a digital document discussion method comprising, a discussion document storage step of storing a digitized discussion document in a discussion document database, an attribute information storage step of storing attribute information on a user as an attribute information database, a template providing step of providing a template to a discussion requester as the user by a frame with a work process and the attribute information corresponding to the discussion document used as keys, a discussion document creation step of creating the discussion document based on the template, a material information accumulation step of accumulating a plurality of items of material information, a discussion request step of requesting a discussion participant as the user to discuss the discussion document created in the discussion document creation step, a search step of searching material information associated with the discussion document requested in the discussion request step from the plurality of items of material information, a material information providing step of providing the material information searched in the search step to the discussion participant when discussing the discussion document.

Further, the template is provided to the discussion requester by the frame with the work process and the attribute information corresponding to the discussion document used as keys, and the discussion document for which a request is issued is created based on this template. Due to this, it is possible to promptly create the discussion document and to issue the request to correspond to the work process. Further, since the searched material information is provided to the discussion participant when discussing the discussion document, it is possible to save labor for searching a material necessary for a discussion and to discuss the discussion document more promptly.

According to still another aspect of the present invention, there is provided a digital document discussion method comprising, a discussion document storage step of storing a digitized discussion document in a discussion document database, an attribute information storage step of storing attribute information on a user as an attribute information database, a template providing step of providing a template to a discussion requester as the user by a frame with a work process and the attribute information corresponding to the discussion document used as keys, a discussion document creation step of creating the discussion document based on the template, a discussion request step of requesting a discussion participant as the user to discuss the discussion document created in the discussion document creation step, a search step of searching material information designated by the discussion participant from a plurality of items of material information associated with the discussion document requested in the discussion request step, a material information providing step of providing the material information searched in the search step to the discussion participant when discussing the discussion document, and a discussion step of allowing the discussion participant to discuss the discussion document requested in the discussion request step in accordance with the work process.

Further, the template is provided to the discussion requester by the frame with the work process and the attribute information corresponding to the discussion document used as keys, and the discussion document for which a request is issued is created based on this template. Due to this, it is possible to promptly create the discussion document and to issue the request to correspond to the work process. Further, since material information designated by the discussion participant from a plurality of items of material information associated with the discussion document is provided to the discussion participant when discussing the discussion document, it is possible to save labor for searching a material necessary for a discussion and to discuss the discussion document more promptly.

Other objects and features of this invention will become understood from the following description with reference to the accompanying drawings.

BRIEF DESCRIPTION OF THE DRAWINGS

FIG. 4 shows the table structure of a user profile information database 600 shown in FIG. 1;

FIG. 5 shows the table structure of a responsible user organization profile information database 610 shown in FIG. 1;

FIG. 7 shows one example of an XML file 700 in this embodiment;

FIG. 8 is a flow chart for describing the operations of this embodiment;

FIG. 24 s hows one example of an authentication screen 800 in this embodiment;

FIG. 25 shows one example of a menu screen 810 in this embodiment;

FIG. 30 shows company ID error screen 860 in this embodiment;

FIG. 31 shows a user ID error screen 865 in this embodiment;

FIG. 36 is an explanatory view for the work process arrangement change processing shown in FIG. 16;

FIG. 37 shows an E-mail address list 900 in this embodiment;

FIG. 38 shows a protocol file 910 in this embodiment;

DETAILED DESCRIPTIONS

One embodiment of a digital document discussion apparatus and a digital document discussion method according to the present invention will be described hereinafter with reference to the accompanying drawings.

Figure 1:
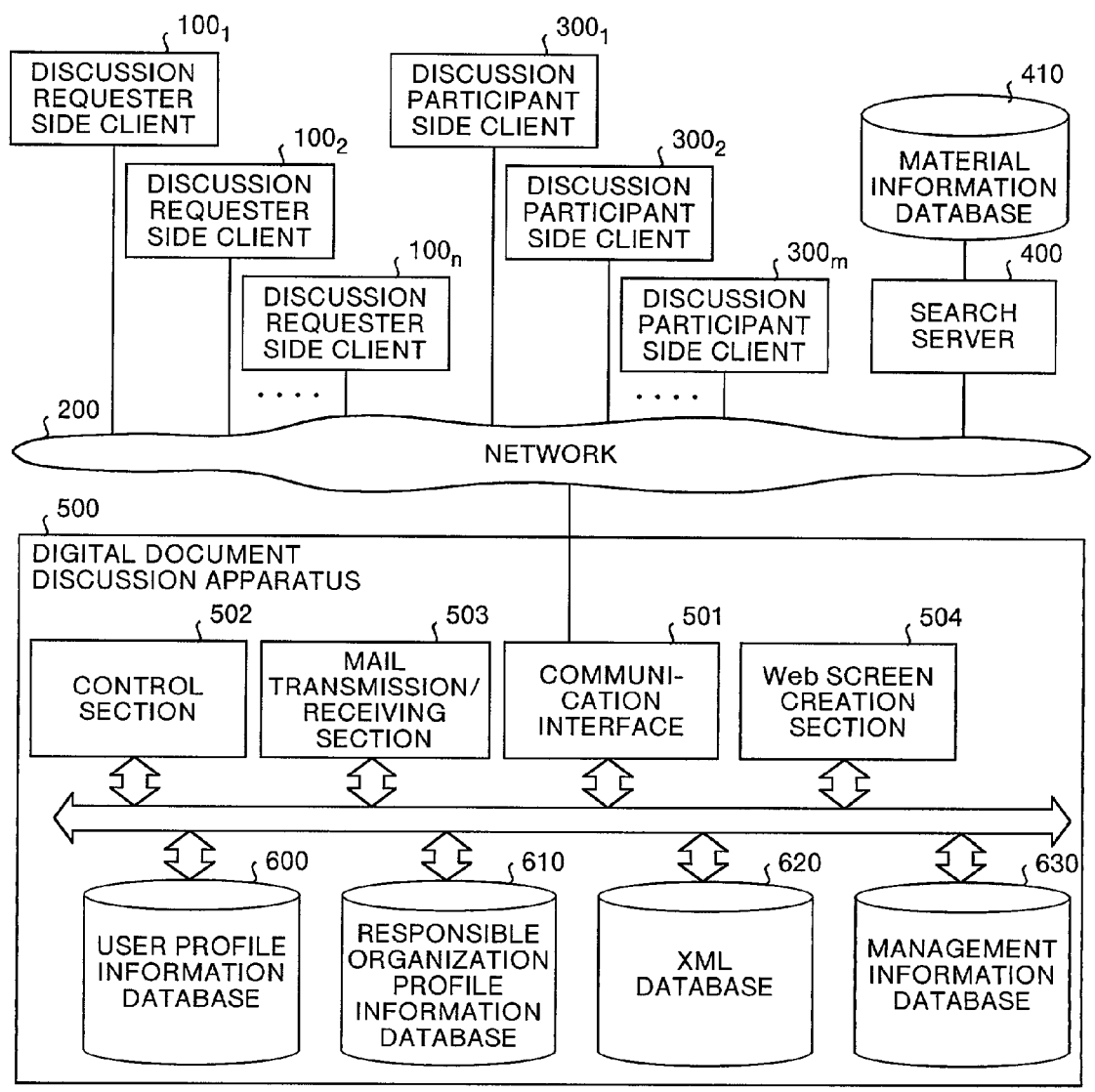
FIG. 1 is a block diagram showing the configuration of one embodiment according to the present invention.

FIG. 1 is a block diagram showing the configuration of one embodiment according to the present invention. A digital document discussion system shown in FIG. 1 consists of discussion requester side clients $100_1$ to $100_n$, discussion participant side clients $300_1$ to $300_m$, a search server 400 and a digital document discussion apparatus 500, which constituent elements are connected to a network 200 such as a WAN (Wide Area Network)/LAN (Local Area Network). For the sake of simple discussion, FIG. 1 does not show communication devices (a terminal adapter, a router, a firewall and the like) necessary for network connection.

The discussion requester side clients $100_1$ to $100_n$ are, for example, n computer apparatuses accessible to the digital document discussion apparatus 500 through the network 200 according to the TCI/IP (Transmission Control Protocol/Internet Protocol). Each of these discussion requester side clients $100_1$ to $100_n$ consists of a computer main body, a display, a keyboard, a mouse and the like.

In addition, these discussion requester side clients $100_1$ to $100_n$ are operated by a plurality of document discussion requesters who request discussion participants to discuss a digitized document (including all types of documents including digitized standard documents, drawings and documents), respectively. The discussion participant means herein a person who discusses a document and sends a reply of a discussion result. Further, each of the discussion requester side clients $100_1$ to $100_n$ is provided with a mailer (not shown) and a Web browser.

The mailer provides a function of transmitting/receiving electronic mail through a mail server which is not shown in FIG. 1. This electronic mail transmission/receiving is conducted using the SMTP (Simple Mail Transfer Protocol) or the POP 3 (Post Office Protocol version 3). The Web browser is a software program for viewing Web pages provided by the digital document discussion apparatus 500.

The discussion participant side clients $300_1$ to $300_m$ are m computers accessible to the digital document discussion apparatus 500 through the network 200 according to the TCI/IP. Each of these discussion participant side clients $300_1$ to $300_m$ consists of a computer main body, a display, a keyboard, a mouse and the like.

In addition, these discussion participant side clients $300_1$ to $300_m$ are operated by a plurality of discussion participants who receive the above-stated document discussion request, respectively. Further, each of these discussion participant side clients $300_1$ to $300_m$ is provided with a mailer and a Web browser, as well.

The search server 400 is a server which searches various types of materials which are referred to, from a material information database 410, when a discussion requester create a standard, a drawing, a document or the like to be discussed or when the discussion participants hold a discussion, with XML (extensible Markup Language) tags to be described later used as keys.

Figure 3:
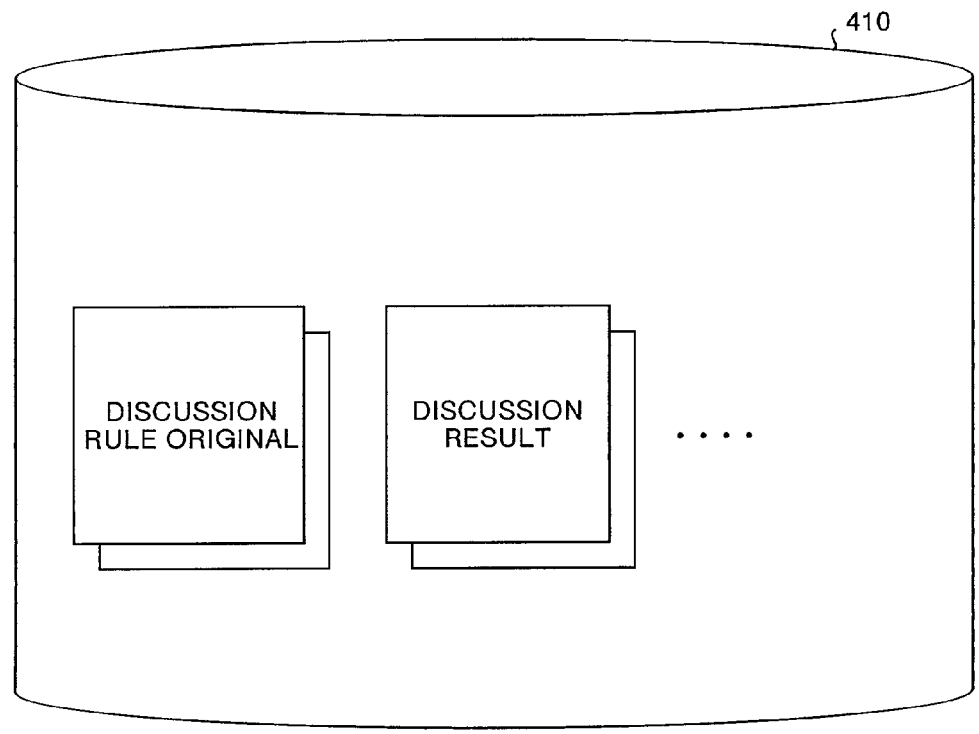
FIG. 3 is a block diagram of a material information database 410 shown in FIG. 1.
Figure 6:
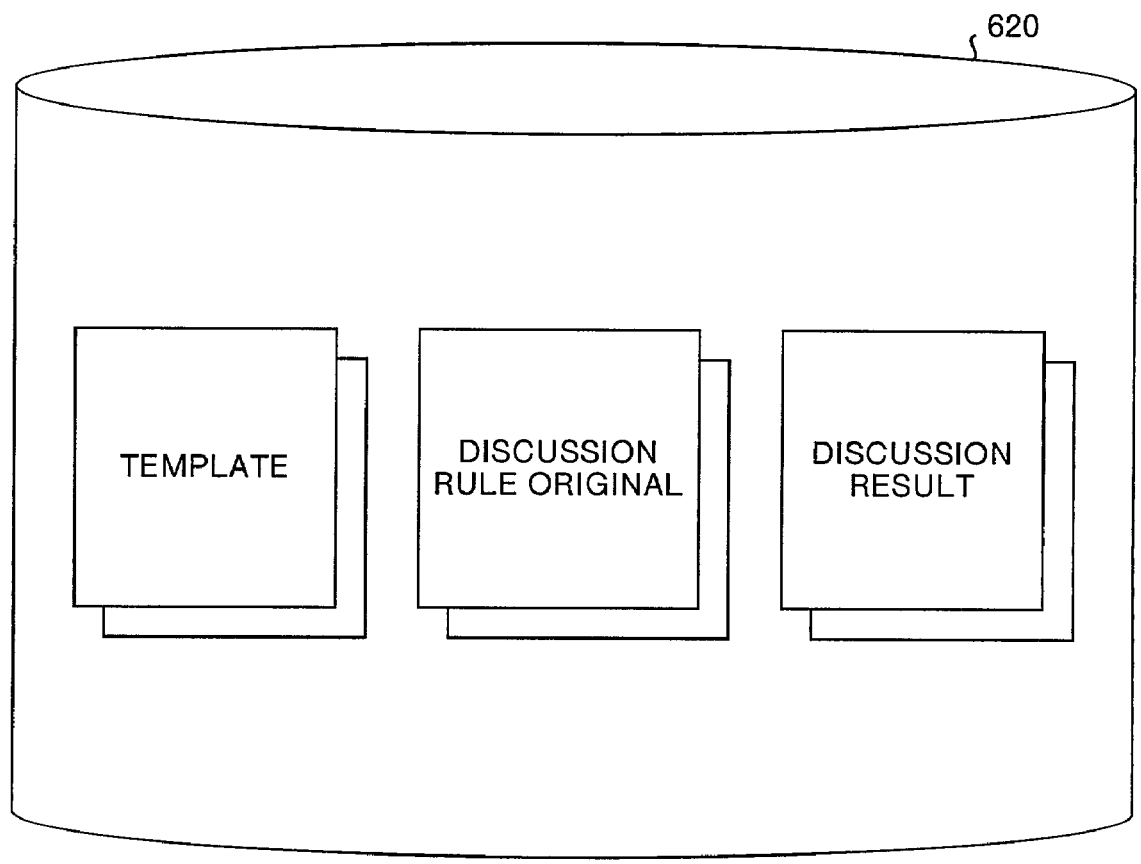
FIG. 6 is a block diagram of an XML database 620 shown in FIG. 1.
Figure 9:
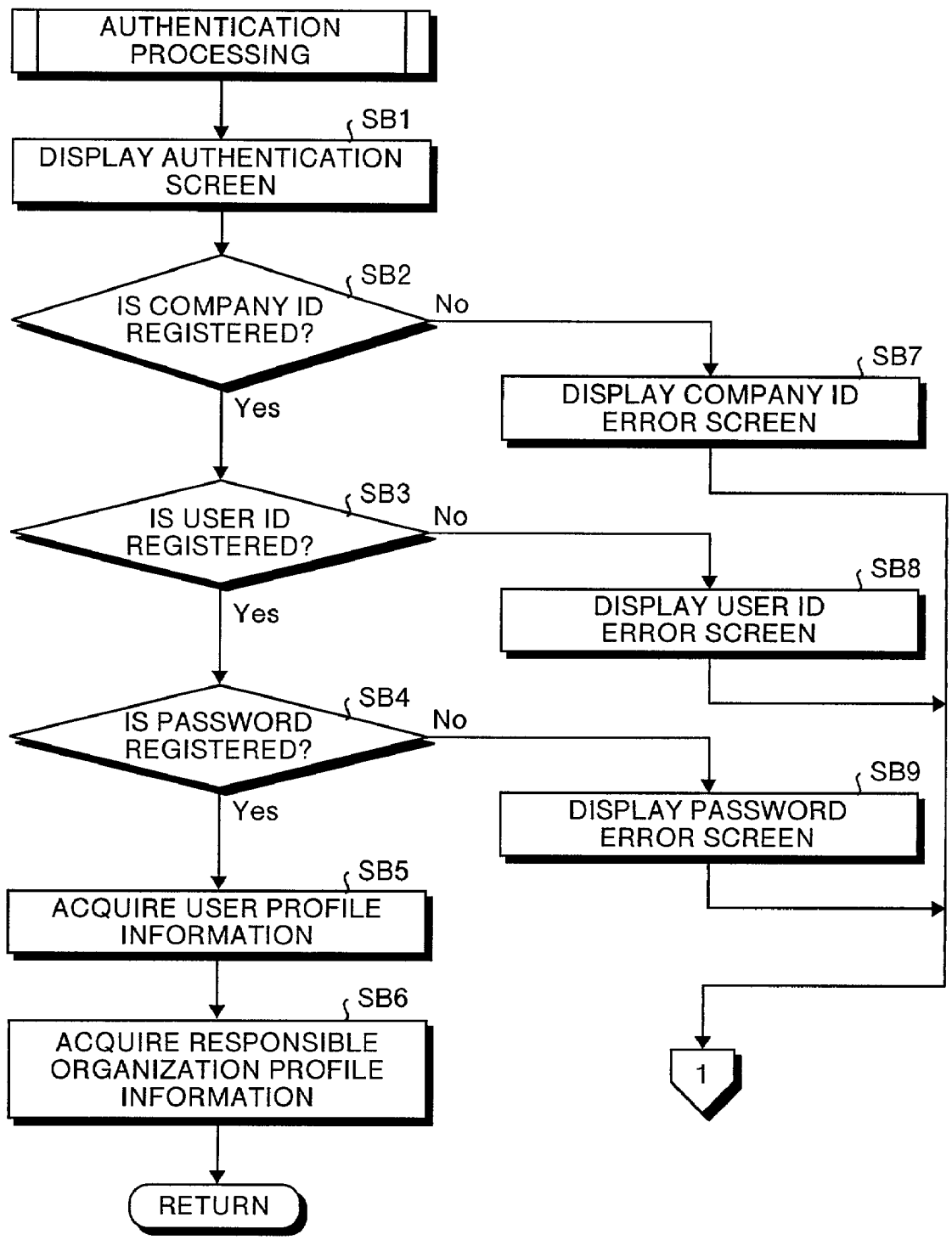
FIG. 9 is a flow chart for describing an authentication processing shown in FIG. 8.

A material information database 410 stores materials having XML tags added to phrases (keywords) as XML files. As shown in FIG. 3, the material information database 410 stores XML files of the originals of discussion rules (standards, drawings, documents and the like), discussion results and the like as materials.

The digital document discussion apparatus 500 is an apparatus which provides various functions related to digital document discussions to the discussion requester side clients $100_1$ to $100_n$ and the discussion participant side clients $300_1$ to $300_m$ through Web screens (see FIGS. 24 to 33) or electronic mail.

In the digital document discussion apparatus 500, a communication interface 501 controls communication between the apparatus 500 and external apparatuses through the network 200 according to the TCP/IP. A control section 502 exercises control in various manners for realizing a digital document discussion function. The operations of this control section 502 will be described later in detail.

A mail transmission/receiving section 503 controls mail transmission and receiving between the digital document discussion apparatus 500 and the external apparatuses. A Web screen creation section 504 automatically creates Web screens shown in FIGS. 24 to 33, respectively.

Figure 2:
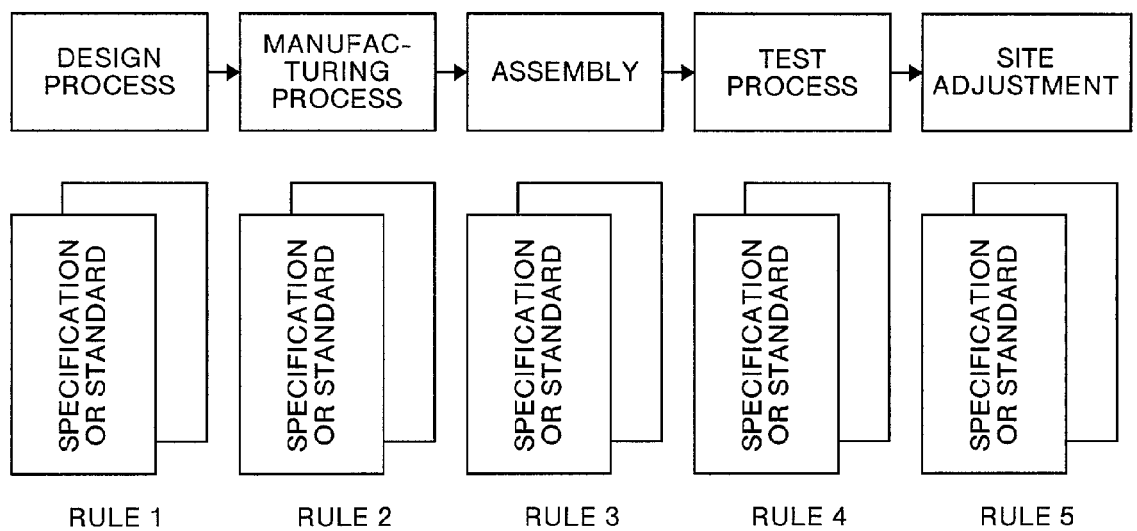
FIG. 2 is an explanatory view for the outline of this embodiment.

Here, in this embodiment, as shown in FIG. 2, Rules 1 to 5 are set for each design and manufacture work process (to be referred to as "work process" hereinafter) consisting of a flow of "design process"→"manufacturing process"→"assembly"→"test process"→"site adjustment", and a discussion document creation processing, a discussion processing and a discussion result processing are executed. The Rules 1 to 5 are specifications or standards.

Referring back to FIG. 1, a user profile information database 600 is a database which stores profile information (user ID, name, . . . , responsible standard, responsible drawing, responsible document, . . . ) on each user (discussion requester or discussion participant) of the digital document discussion apparatus 500 as shown in FIG. 4.

Referring back to FIG. 1, a responsible organization profile information database 610 is a database which stores responsible organization profile information (company name, headquarters name, . . . , responsible standard, responsible drawing, responsible document, . . . ) on each user (discussion requester or discussion participant) as shown in FIG. 5.

Referring back to FIG. 1, an XML database 620 stores XML files such as templates used to create a discussion document, the originals of discussion rules (standards, drawings, documents and the like), discussion results and the like.

FIG. 7 shows one example of an XML file 700 stated above. Since each user can define user-specific tags (to be referred to as "XML tags" hereinafter) using this XML, the XML is a markup language having high extension capability. In addition, the XML enables a user to view information using the Web browser and to directly pick up information from the material information database 410 and the XML database 620.

Referring back to FIG. 1, a management information database 630 stores user management information (user ID's, company ID's, passwords, and the like).

Next, the operations of the embodiment stated above will be described while referring to flow charts shown in FIGS. 8 to 23, respectively and screens (Web pages) shown in FIGS. 24 to 33, respectively.

At step SA1 shown in FIG. 8, the control section 502 of the digital document discussion apparatus 500 determines whether or not the apparatus 500 is accessed through the network 200 by any one of the discussion requester side clients $100_1$ to $100_n$ and the discussion participant side clients $300_1$ to $300_m$. If the determination result of the step SA1 is "No", the control section 502 repeats this determination.

Here, if the discussion requester side client $100_1$ accesses the digital document discussion apparatus 500 through the network 200, the control section 502 outputs "Yes" as the determination result of the step SA1. At step SA2, the control section 502 executes an authentication processing. To be specific, at step SB1 shown in FIG. 9, the control section 502 controls the discussion requester side client $100_1$ to display an authentication screen 800 shown in FIG. 24.

This authentication screen 800 is a screen for inputting authentication information (company ID, user ID and password) necessary to authenticate an associated user (discussion requester in this case). On this authentication screen 800, a company ID enter column 801 for inputting a company ID, a user ID enter column 802 for inputting a user ID and a password enter column 803 for inputting a password are displayed.

The discussion requester inputs the company ID, the user ID and the password of the requester into the company ID enter column 801, the user ID enter column 802 and the password enter column 803, respectively, and then depresses a log-in button (not shown).

Following this, at step SB2, the control section 502 determines whether or not the company ID inputted into the company ID enter column 801 is registered in the management information database 630. If the determination result of the step SB2 is "No", the control section 502 controls the discussion requester side client $100_1$ to display a user ID error screen 860 shown in FIG. 30 indicating that the authentication result is a company ID error at step SB7.

On the other hand, if the determination result of the step SB2 is "Yes", the control section 502 determines whether or not the user ID inputted into the user ID enter column 802 is registered in the management information database 630 at step SB3. If the determination result of the step SB3 is "No", the control section 502 controls the discussion requester side client $100_1$ to display a user ID error screen 865 shown in FIG. 31 indicating that the authentication result is a user ID error at step SB8.

On the other hand, if the determination result of the step SB3 is "Yes", the control section 502 determines whether or not the password inputted in the password enter column 803 is registered in the management information database 630 at step SB4. If the determination result of this step SB4 is "No", the control section 502 controls the discussion requester side client $100_1$ to display a password error screen 870 shown in FIG. 32 indicating that the authentication result is a password error at step SB9.

If the determination result of the step SB4 is "Yes", i.e., all authentication results are OK, then the control section 502 acquires user profile information corresponding to the discussion requester from the user profile information database 600 (see FIG. 4) at step SB5. At step SB6, the control section 502 acquires responsible organization profile information corresponding to the discussion requester from the responsible organization profile information database 610 (see FIG. 5).

Referring back to FIG. 8, at step SA3, the control section 502 controls the discussion requester side client $100_1$ to display a menu screen 810 shown in FIG. 25. This menu screen 810 is a screen for making the user (discussion requester or discussion participant) select one of "Document creation", "Discussion request", "Discussion receive" and "Discussion result processing".

"Document creation", "Discussion request" and "Discussion result processing" are selected by discussion requesters. "Document creation" is a menu for creating a document or the like (standard, drawing, document or the like) to be discussed and corresponds to a document creation button 811. "Discussion request" is a menu for requesting the discussion of a document or the like to discussion participants from the discussion requester and corresponds to a discussion request button 812.

"Discussion result processing" is a menu for executing a processing related to discussion results so as to reflect the discussion results in the document or the like and corresponds to a discussion result processing button 814. "Discussion receive" is selected by the discussion requesters. "Discussion receive" is a menu for receiving a discussion request from the discussion requester and corresponds to a discussion receive button 813.

Referring back to FIG. 8, at step SA4, the control section 502 determines whether or not the document creation button 811 shown in FIG. 25 has been depressed. In this case, the determination result of the step SA4 is assumed as "No". At step SA5, the control section 502 determines whether or not the discussion request button 812 has been depressed. In this case, the determination result of the step SA5 is assumed as "No".

At step SA6, the control section 502 determines whether or not the discussion receive button 813 has been depressed. In this case, the determination result of the step SA6 is assumed as "No". At step SA7, the control section 502 determines whether or not the discussion result processing button 814 has been depressed. In this case, the determination result of the step SA7 is assumed as "No". At step SA8, the control section 502 determines whether or not an end indication has been issued. In this case, the determination result of the step SA8 is assumed as "No". Subsequently, the control section 502 repeats the determinations of the steps SA4 to SA8.

Here, if the discussion requester depresses the document creation button 811, the control section 502 outputs "Yes" as the determination result of the step SA4. At step SA9, the control section 502 executes a document creation processing.

Figure 10:
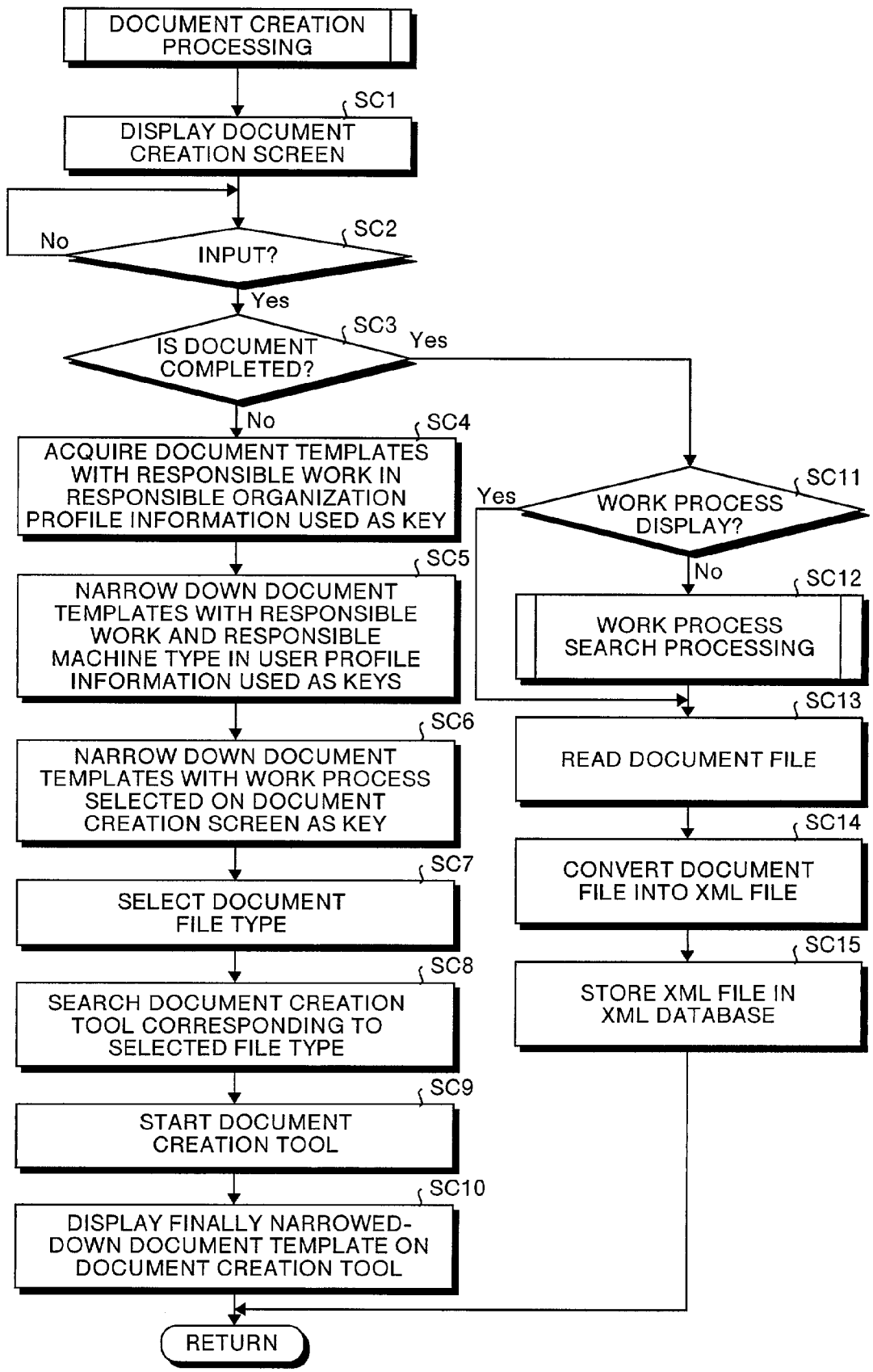
FIG. 10 is a flow chart for describing a document creation processing shown in FIG. 8.
Figure 26:
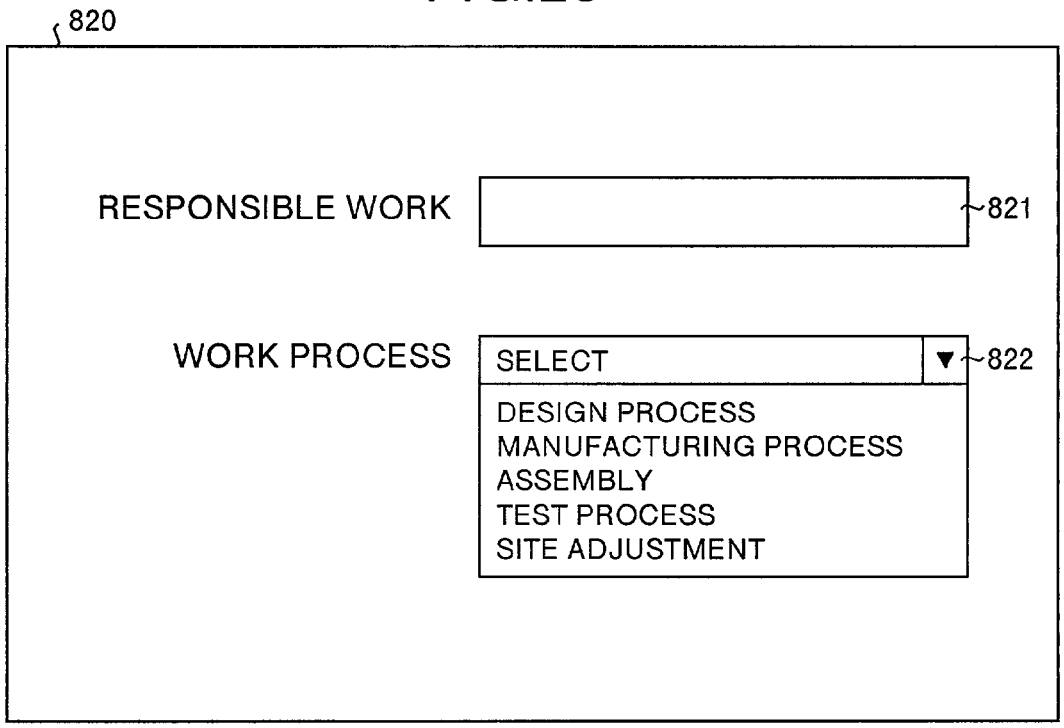
FIG. 26 shows a document creation screen 820 in this embodiment.

To be specific, at step SC1 shown in FIG. 10, the control section 502 controls the discussion requester side client $100_1$ to display a document creation screen 820 shown in FIG. 26. This document creation screen 820 is a screen for displaying responsible work in the responsible organization profile information (see FIG. 5) corresponding to the discussion requester in a responsible work display column 821 and for making the discussion requester select one of "Design process", "Manufacturing process", "Assembly", "Test process" and "Site adjustment" as a work process (see FIG. 2) in a work process select column 822.

At step SC2, the control section 502 determines whether or not the work process has been selected in the work process select column 822. In this case, the determination result of the step SC2 is assumed as "No". If the discussion requester selects the work process in the work process select column 822, the control section 502 outputs "Yes" as the determination result of the step SC2.

At step SC3, the control section 502 determines whether or not the document or the like (standard, drawing, document or the like) to be discussed has been already completed, based on the input operation of the discussion requester. If the determination result of this step SC3 is "No", the control section 502 acquires document templates from the XML database 620 with the responsible work in the responsible organization profile information (see FIG. 5) corresponding to the discussion requester used as a key at step SC4.

At step SC5, the control section 502 narrows down the document templates acquired in the step SC4 with the responsible work and responsible machine type in the user profile information (see FIG. 4) corresponding to the discussion requester used as keys. At step SC6, the control section 502 further narrows down the document templates narrowed down in the step SC5 with the work process as a key selected in the work process select column 822 (see FIG. 26) on the document creation screen 820.

At step SC7, the control section 502 automatically selects a file type for the document to be discussed based on a preset file type priority order. At step SC8, the control section 502 controls the discussion requester side client $100_1$ to search a document creation tool corresponding to the file type selected in the step SC7 from a plurality of document creation tools installed in the discussion requester side client $100_1$.

At step SC9, the control section 502 controls the discussion requester side client $100_1$ to start the document creation tool searched in the step SC8. At step SC10, the control section 502 controls the discussion requester side client $100_1$ to display the finally narrowed-down document template on the document creation tool on a frame (a screen of HTML, XML or the like).

As a result, the discussion requester creates a document to be discussed using the document template corresponding to the responsible work in the responsible organization profile information, the responsible work and responsible machine type in the user profile information and the work process.

On the other hand, if the determination result of the step SC3 is "Yes", the control section 502 determines whether or not a work process is displayed on the completed document at step SC11. If the determination result of the step SC11 is "Yes", the control section 502 executes a processing at step SC13. If the determination result of the step SC11 is "No", the control section 502 executes a work process search processing for searching a work process corresponding to the document at step SC12.

Figure 11:
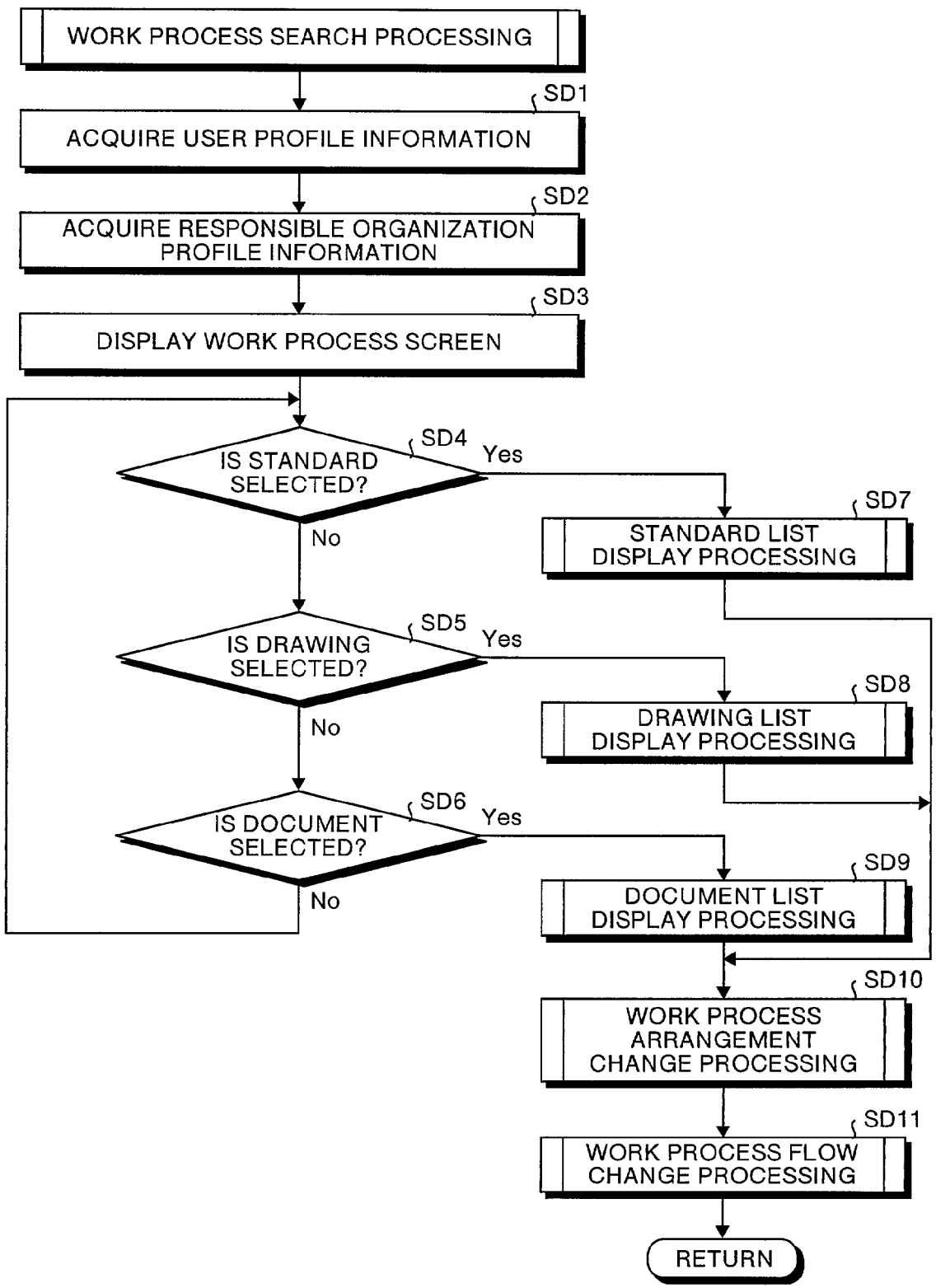
FIG. 11 is a flow chart for describing a work process search processing shown in FIG. 10.
Figure 12:
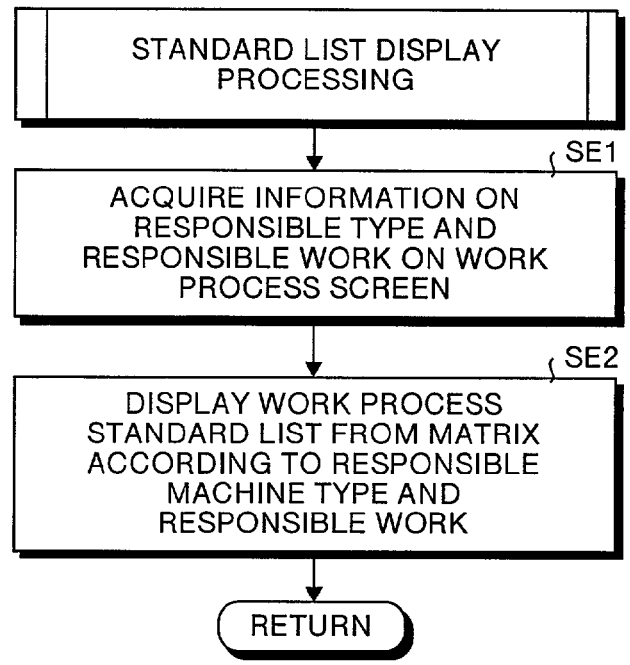
FIG. 12 is a flow chart for describing a standard list display processing shown in FIG. 11.
Figure 13:
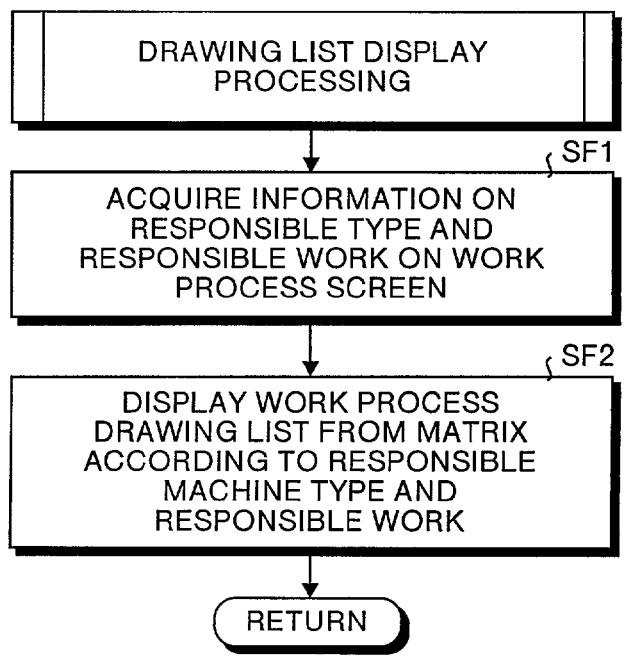
FIG. 13 is a flow chart for describing a drawing list display processing shown in FIG. 11.
Figure 14:
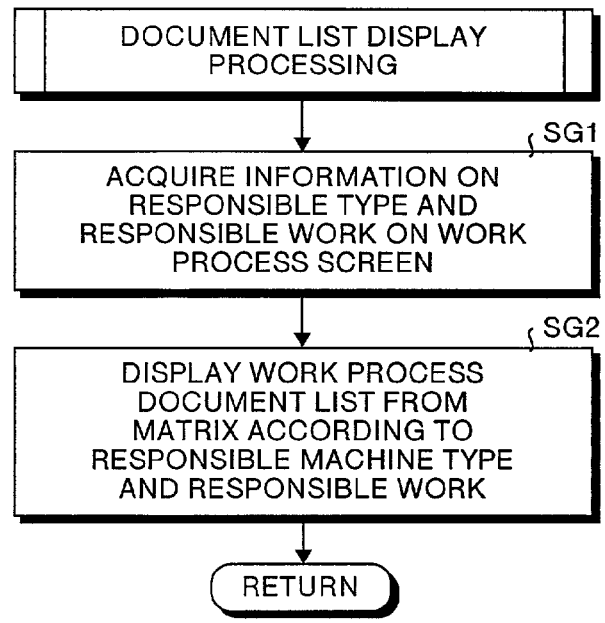
FIG. 14 is a flow chart for describing a document list display processing shown in FIG. 11.

To be specific, at step SD1 shown in FIG. 11, the control section 502 acquires user profile information corresponding to the discussion requester. At step SD2, the control section 502 acquires responsible organization profile information corresponding to the discussion requester. At step SD3, the control section 502 creates a work process pattern based on the user profile information and the responsible organization profile information, and controls the discussion requester side client $100_1$ to display a work process screen 880 shown in FIG. 33 based on the created work process pattern.

On this work process screen 880, a responsible machine type corresponding to the user profile information and the responsible organization profile information is displayed in a responsible machine type display column 881. In a responsible work display column 882, responsible work corresponding to the user profile information and the responsible organization profile information is displayed. An object select column 883 is a column for selecting an object (standard, drawing or document) to be discussed.

Figure 33:
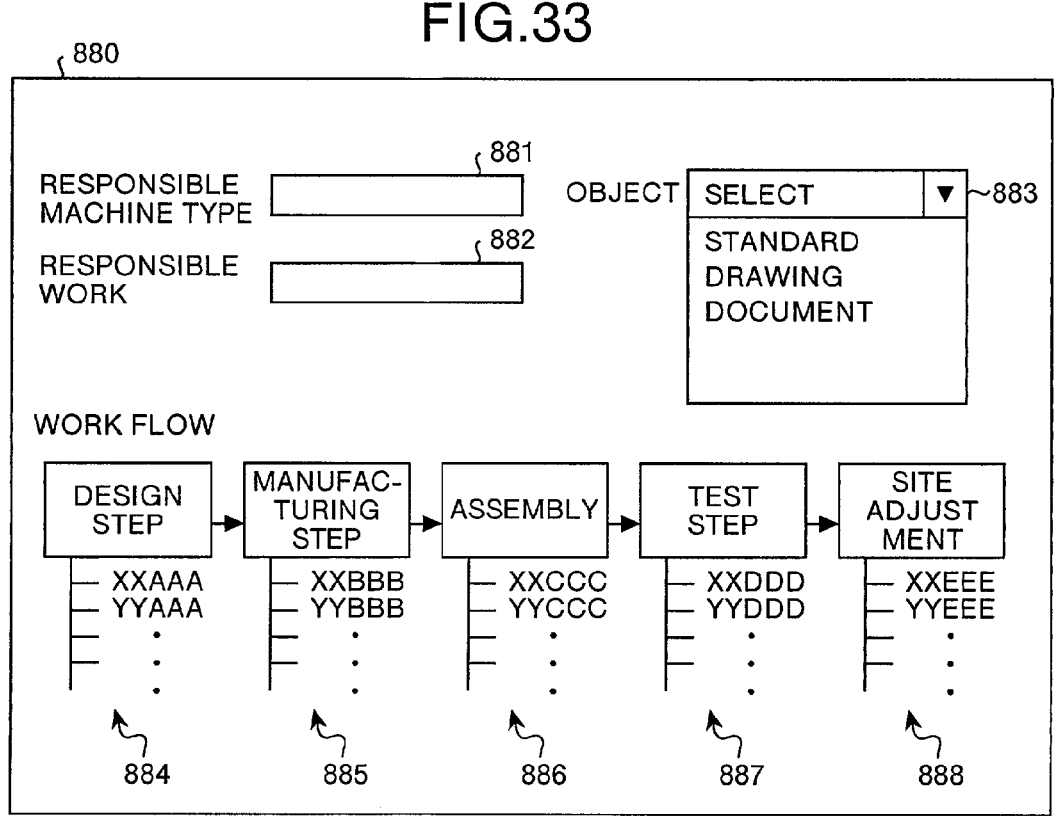
FIG. 33 shows a work process screen 880 in this embodiment.

FIG. 33 also shows a work flow representing a work process flow of "Design step"→"Manufacturing step"→"Assembly"→"Test step"→"Site adjustment". A design step object list 884 is a list of objects (standards, drawings or documents) in a design step. A manufacturing step object list 885 is a list of objects (standards, drawings or documents) in a manufacturing step.

An assembly object list 886 is a list of objects (standards, drawings or documents) in an assembly step. A test step object list 887 is a list of objects (standards, drawings or documents) in a test step. A site adjustment object list 888 is a list of objects (standards, drawings or documents) in a site adjustment step.

At step SD4, the control section 502 determines whether or not the discussion requester has selected a standard in the object select column 883. In this case, the determination result of the step SD4 is assumed as "No". At step SD5, the control section 502 determines whether or not the discussion requester has selected a drawing in the object select column 883. In this case, the determination result of the step SD4 is assumed as "No".

At step SD6, the control section 502 determines whether or not the discussion requester has selected a document in the object select column 883. In this case, the determination result of the step SD6 is assumed as "No". Subsequently, the control section 502 repeats the determinations of the steps SD4 to SD6.

Here, if the discussion requester selects a standard in the object select column 883, the control section 502 outputs "Yes" as the determination result of the step SD4. At step SD7, the control section 502 executes a standard list display processing. To be specific, at step SE1 shown in FIG. 12, the control section 502 acquires responsible machine type information and responsible work information on the work process screen 880 shown in FIG. 33. At step SE2, the control section 502 displays (controls the discussion requester side client $100_1$ to display) a work process standard list (such as the design step object list 884) from a matrix according to the responsible machine type and the responsible type on the work process screen 880.

Further, if the discussion requester selects the drawings in the object select column 883, the control section 502 outputs "Yes" as the determination result of the step SD5. At step SD8, the control section 502 executes a drawing list display processing. To be specific, at step SF1 shown in FIG. 13, the control section 502 acquires responsible machine type information and responsible work information on the work process screen 880 shown in FIG. 33. At step SF2, the control section 502 displays (controls the discussion requester side client $100_1$ to display) a work process drawing list (such as the design step object list 884) from a matrix according to the responsible machine type and the responsible work on the work process screen 880.

Further, if the discussion requester selects the document in the object select column 883, the control section 502 outputs "Yes" as the determination result of the step SD6. At step SD9, the control section 502 executes a document list display processing. To be specific, at step SG1 shown in FIG. 14, the control section 502 acquires responsible machine type information and responsible work information on the work process screen 880 shown in FIG. 13. At step SG2, the control section 502 displays (controls the discussion requester side client $100_1$ to display) a work process document list (such as the design step object list 884) from a matrix according to the responsible machine type and the responsible type on the work process screen 880.

Referring back to FIG. 11, at step SD10, the control section 502 executes a work process arrangement change processing for changing the arrangement of the list (such as the design step object list 884) in the work process on the work process screen 880.

Figure 16:
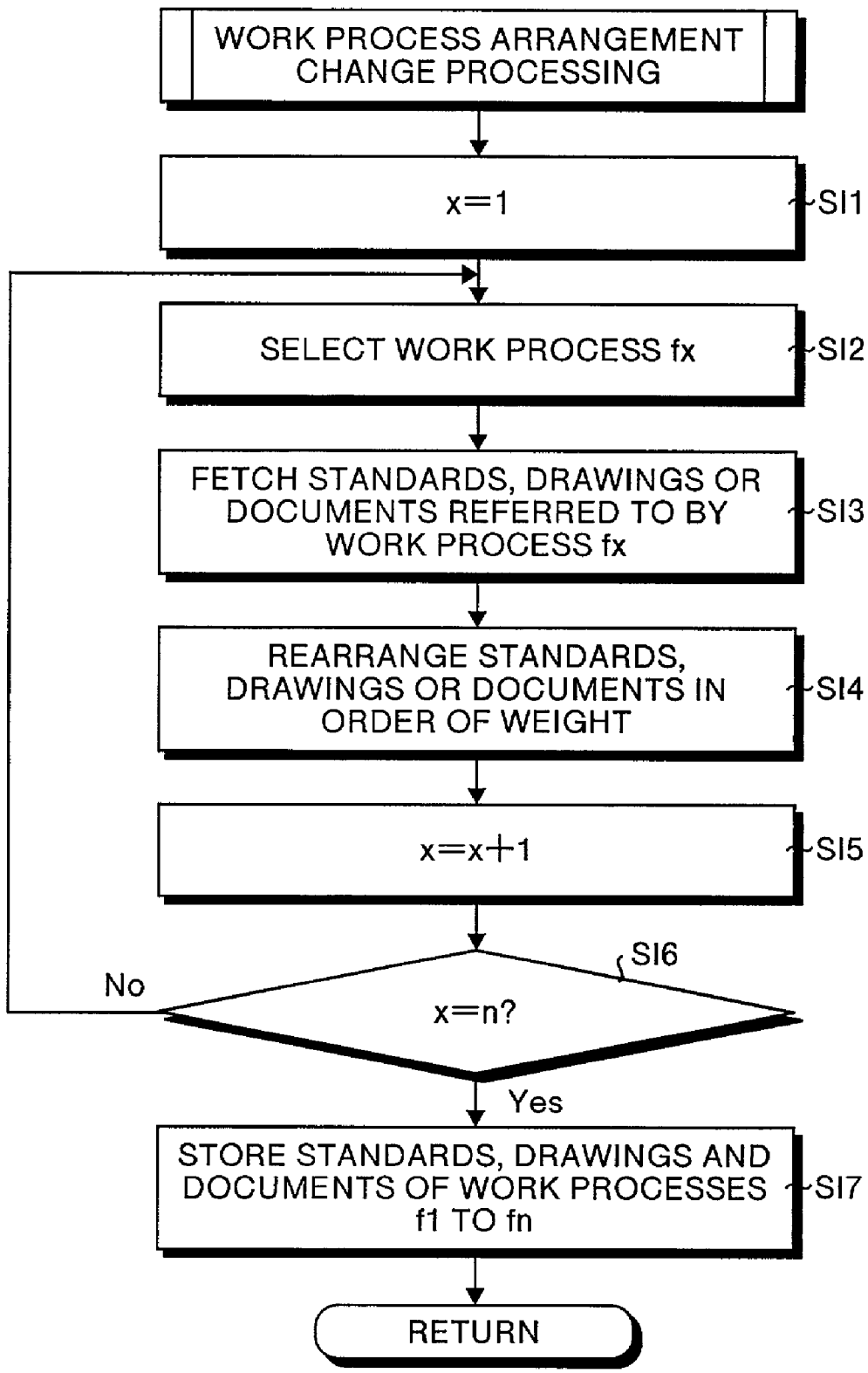
FIG. 16 is a flow chart for describing work process arrangement change processing shown in FIG. 11.

To be specific, at step SI1 shown in FIG. 16, the control section 502 sets a counter x at 1. At step SI2, the control section 502 selects a work process fx from work processes f1 to fn shown in FIG. 36. The work processes f1 to fn correspond to "Design step" to "Site adjustment" shown in FIG. 33, respectively.

At step SI3, the control section 502 fetches standards, drawings or documents (which are specifically the design step object list 884 or the like) referred to by the work process fx. In the example shown in FIG. 36, objects A, B, . . . and N (standards, drawings or documents) are referred to by the work process fx. At step SI4, the control section 502 rearranges the standards, drawings or documents (object list) in the order of weights (w0, w1, w2, . . . and wn) according to the frequency of use.

At step SI5, the control section 502 increments the counter by 1. At step SI6, the control section 502 determines whether or not the counter x is n. In this case, the determination result of the step SI6 is assumed as "No".

Subsequently, after the step SI2, the arrangement of the work process is sequentially rearranged for each of the work processes f2 to fn. If the determination result of the step SI6 is "Yes", the control section 502 stores information on the standards, drawings or documents after changing the arrangement thereof for each of the work processes f1 to fn in the XML database 620 at step SI7.

Figures 34, 35:
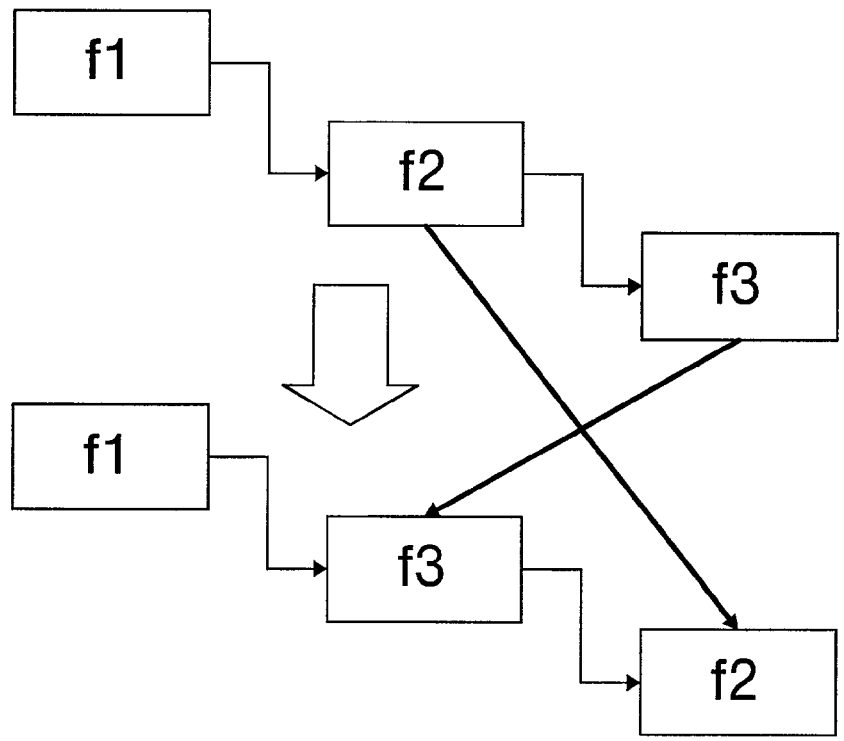
FIG. 34 is an explanatory view for the work process flow change processing shown in FIG. 15.
FIG. 35 is an explanatory view for the work process flow change processing shown in FIG. 15.

Referring back to FIG. 11, at step SD11, the control section 502 executes a work flow change processing for changing the work flow on the work process screen 880 shown in FIG. 33. To be specific, at step SH1 shown in FIG. 15, the control section 502 acquires a work process flow (f1, f2 and f3: see FIG. 34). FIG. 34 shows a work process flow consisting of the work processes f1, f2 and f3. In FIG. 34, the number of work processes is set at three for the brevity of description.

At step SH2, the control section 502 obtains patterns each of a combination of the work processes f1, f2 and f3 as shown in FIG. 35. Pattern names P0 to P5 are allocated to the respective patterns. Next, the control section 502 counts work paths in each pattern. FIG. 35 shows counters C0 to C5 as a result of counting for the respective patterns.

At step SH3, the control section 502 rearranges the work flow in a descending order of counter (in a descending order of the frequency of use). At step SH4, the control section 502 stores a rearrangement result in the XML database 620.

Referring back to FIG. 10, at step SC13, the control section 502 reads the completed document file (standards, drawings or documents) from the discussion request side client 100₁. At step SC14, the control section 502 converts the document file into an XML file in accordance with the user ID, the responsible work, the responsible machine type and the responsible model. At step SC15, the control section 502 stores the XML file in the XML database 620. The control section 502 also stores the XML file in the material information database 410 as a material (technical document or the like).

Next, description will be given to a case where a discussion requester requests discussion participants to discuss an object (standard, drawing or document). In this case, the discussion requester depresses the discussion request button 812 shown in FIG. 25. If the button 812 is depressed, the control section 502 outputs "Yes" as the determination result of the step SA5 and executes a discussion request processing at step SA10.

Figure 17:
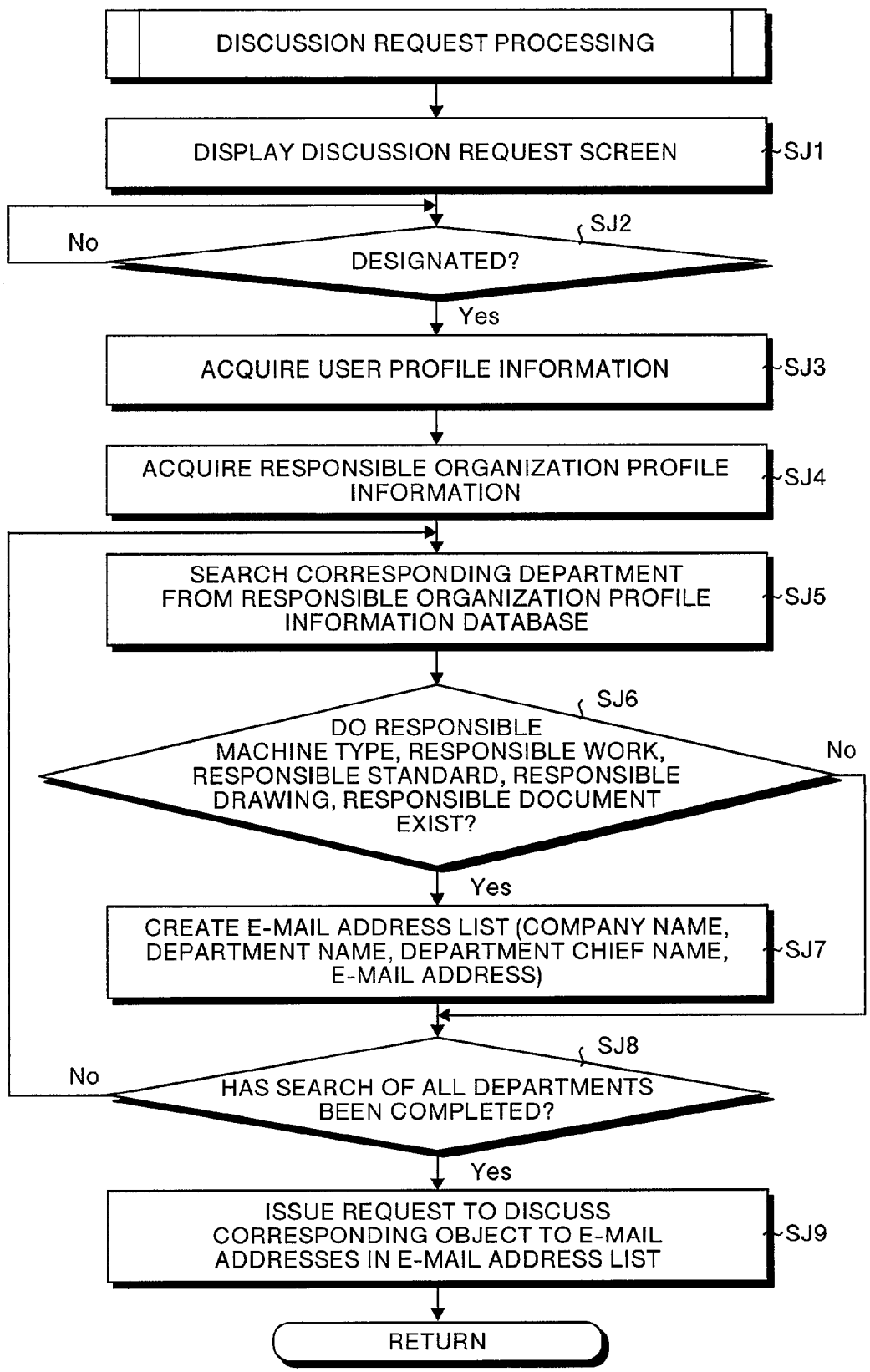
FIG. 17 is a flow chart for describing a discussion request processing shown in FIG. 8.
Figure 27:
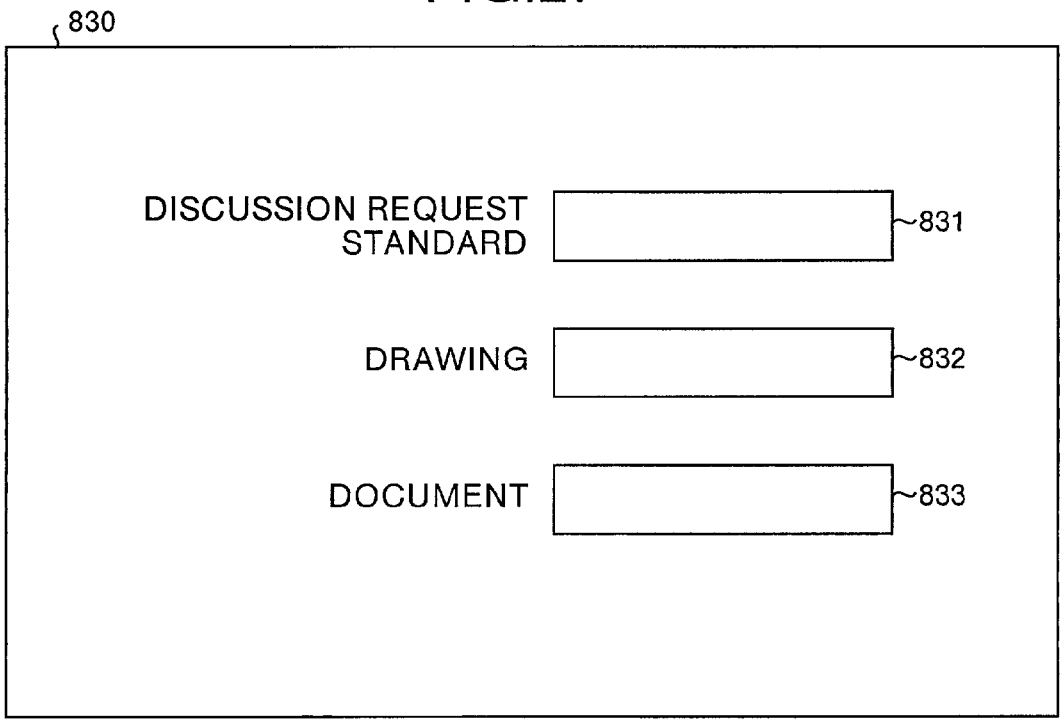
FIG. 27 shows a discussion request screen 830 in this embodiment.

To be specific, at step SJ1 shown in FIG. 17, the control section 502 controls the discussion requester side client 100₁ to display a discussion request screen 830 shown in FIG. 27. This discussion request screen 830 is a screen for requesting discussion participants to discuss an object (standard, drawing or document) created in advance.

On this discussion request screen 830, a discussion request standard designation column 831 is a column for designating a standard as an object for which a discussion request is issued. A discussion request drawing designation column 832 is a column for designating a drawing as an object for which the discussion request is issued. A discussion request document designation column 833 is a column for designating a document as an object for which the discussion request is issued.

At step SJ2, the control section 502 determines whether or not the discussion requester has designated an object for which the discussion request is issued. In this case, the determination result of the step SJ2 is assumed as "No" and this determination is repeated. If the discussion requester designates an object, the control section 502 outputs "Yes" as the determination result of the step SJ2.

At step SJ3, the control section 502 acquires user file information corresponding to the discussion requester from the user profile information database 600. At step SJ4, the control section 502 acquires responsible organization profile information corresponding to the discussion requester from the responsible organization profile information database 610.

At step SJ5, the control section 502 searches departments to which a discussion is requested from the responsible organization profile information database 610. At step SJ6, the control section 502 determines whether or not the responsible machine type, responsible work and responsible standard (or responsible drawing or responsible document) corresponding to the object exist in the responsible organization profile information database 610. If the determination result of the step SJ6 is "No", the control section 502 conducts a determination at step SJ8.

On the other hand, if the determination result of the step SJ6 is "Yes", the control section 502 creates an E-mail address list 900 shown in FIG. 37 based on company names, department names, department chief names and E-mail addresses in the responsible organization profile information database 610 (see FIG. 5) at step SJ7. This E-mail address list 900 is a list related to parties to which the discussion of the object is requested.

At step SJ8, the control section 502 determines whether or not search of all departments has been completed. In this case, the determination result of the step SJ8 is assumed as "No". Subsequently, the steps SJ5 to SJ8 are repeatedly executed and the E-mail addresses of the respective object discussion request parties (departments) are stored in the E-mail address list 900.

If the determination result of the step SJ8 becomes "Yes", the control section 502 issues a request to discuss the object (standard, drawing or document) to the E-mail addresses (relevant discussion participant side clients among the discussion participant side clients 300₁ to 300ₘ) in the E-mail address list 900 by attaching the request to each electronic mail.

Next, description will be given to a case where a discussion request from a discussion requester is received by a discussion participant. In this case, the discussion participant who received the above-stated mail depresses the discussion receive button 813 shown in FIG. 25. If the button 813 is depressed, the control section 502 outputs "Yes" as the determination result of the step SA6 and executes a discussion receive processing at step SA11.

Figure 18:
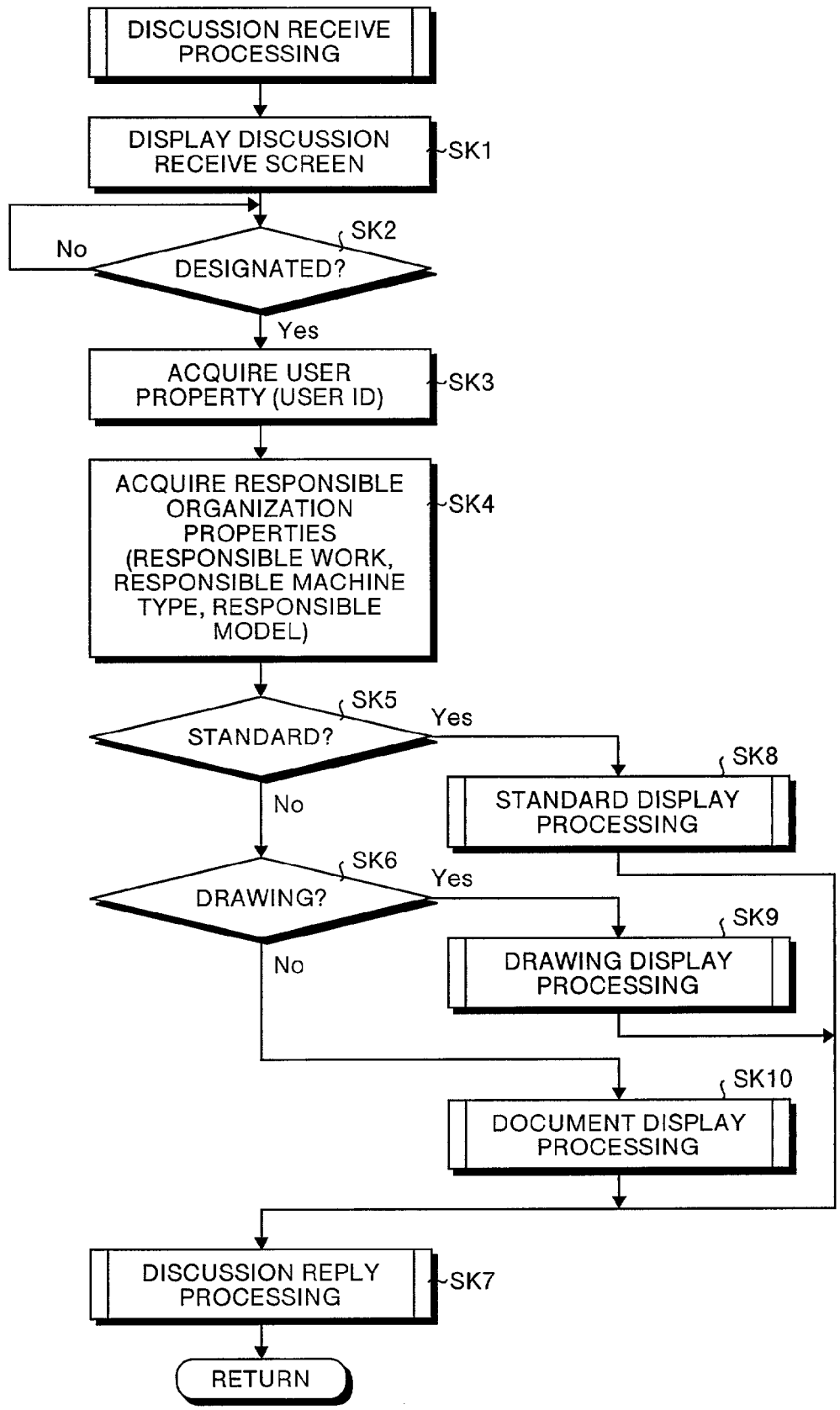
FIG. 18 is a flow chart for describing a discussion receive processing shown in FIG. 8.
Figure 28:
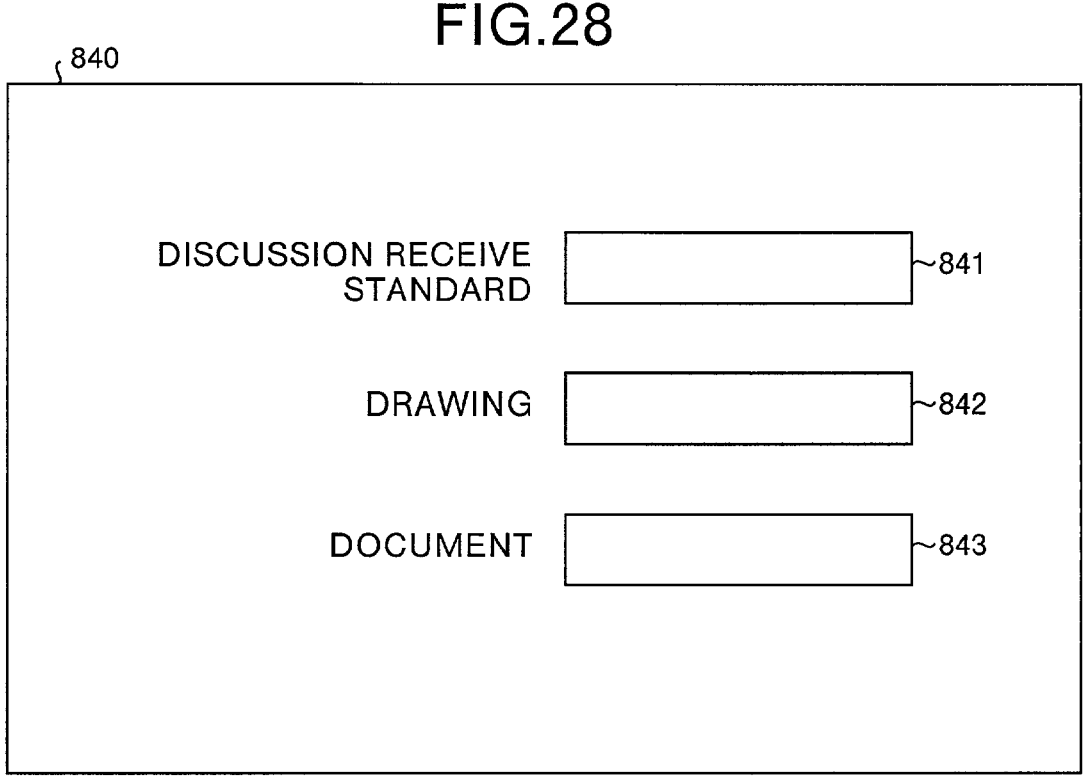
FIG. 28 shows a discussion receive screen 840 in this embodiment.

To be specific, at step SK1 shown in FIG. 18, the control section 502 controls, for example, the discussion participant side client 300$_1$ to display a discussion receive screen 840 shown in FIG. 28. This discussion receive screen 840 is a screen for receiving a discussion of an object (standard, drawing or document) requested from a discussion requester.

On this discussion receive screen 840, a discussion receive standard designation column 841 is a column for designating a standard as a discussion receive target object. A discussion receive drawing designation column 842 is a column for designating a drawing as a discussion receive target object. A discussion receive document designation column 843 is a column for designating a document as a discussion receive target object.

At step SK2, the control section 502 determines whether or not a discussion receive target object has been designated on the discussion receive screen 840. In this case, the determination result of the step SK2 is assumed as "No" and this determination is repeated. If the discussion recipient designates an object, the control section 502 outputs "Yes" as the determination result of the step SK2.

At step SK3, the control section 502 acquires user profile information corresponding to the discussion participant from the user profile information database 600. Next, the control section 502 acquires a property (user ID) from the user profile information (user profile information database 600).

At step SK4, the control section 502 acquires responsible organization profile information corresponding to the discussion participant from the responsible organization profile information database 610. Next, the control section 502 acquires properties (responsible work, responsible machine type and responsible model) from the responsible organization profile information (responsible organization profile information database 610).

At step SK5, the control section 502 determines whether or not a standard has been designated in the discussion receive standard designation column 841 shown in FIG. 28. In this case, the determination result of the step SK5 is assumed as "Yes". At step SK8, the control section 502 executes a standard display processing for displaying a material (materials) related to the discussion receive target object (standard in this case) shown in FIG. 33.

Figure 19:
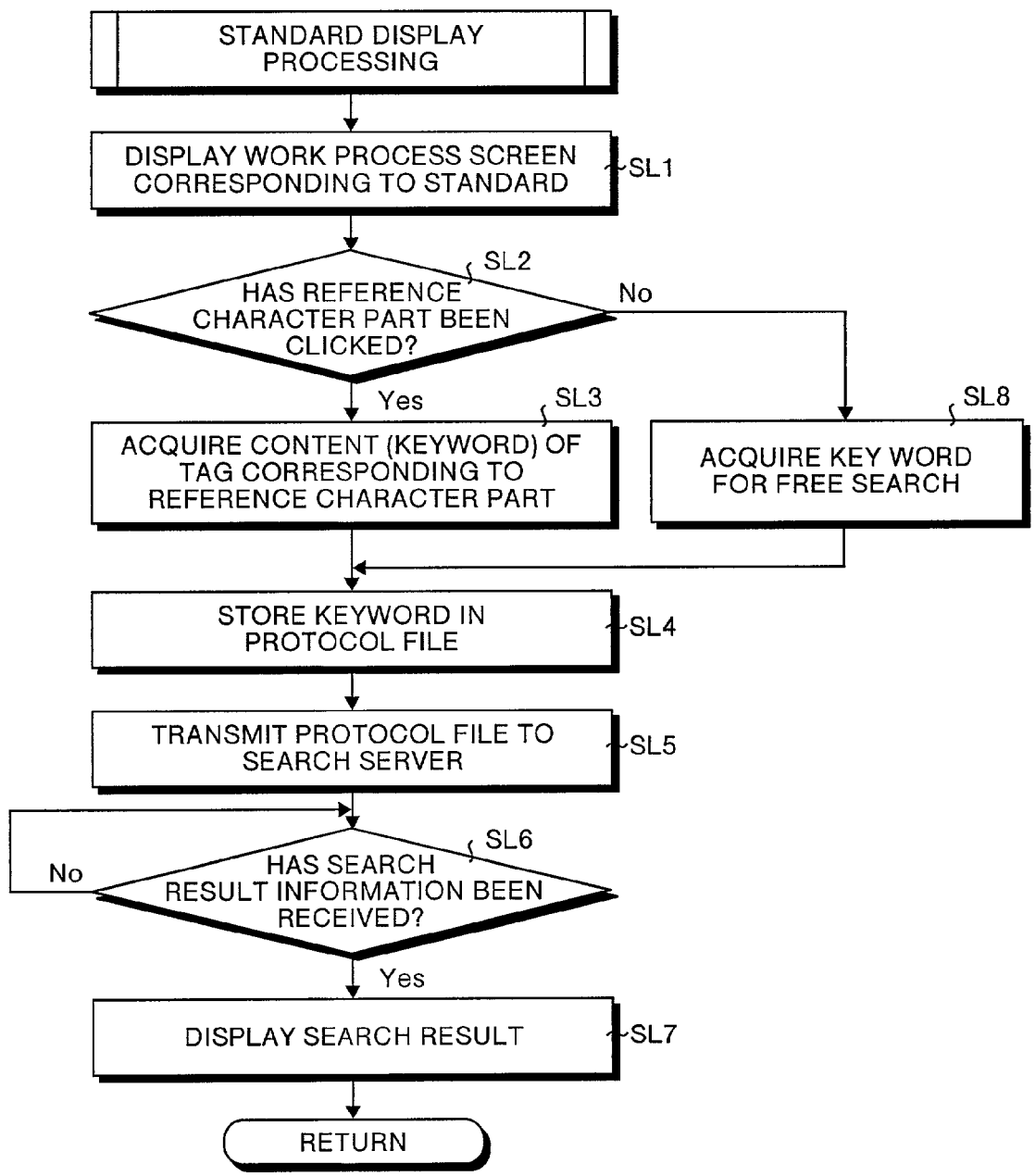
FIG. 19 is a flow chart for describing a standard display processing shown in FIG. 18.

To be specific, at step SL1 shown in FIG. 19, the control section 502 controls the client of the corresponding discussion participant (e.g., the discussion participant side client 300$_1$) to display the work process screen 880. On this work process screen 880, information on the object (standard in this case) for which the discussion requester has requested discussion is displayed.

At step SL2, the control section 502 determines whether or not a reference character part (a part of, for example, the design step object list 884) on the work process screen 880 has been clicked. Here, if the discussion participant clicks XXAAA on the design step object list 884, the control section 502 outputs "Yes" as the determination result of the step SL2.

At step SL3, the control section 502 acquires the content (keyword) of a tag corresponding to the character part which has been clicked from the management information database 630. That is, in the step SL3, a keyword is extracted from the XML file corresponding to the discussion receive target object (standard in this case).

At step SL4, the control section 502 stores the above-stated keyword in a protocol file 910 shown in FIG. 38. At step SL5, the control section 502 transmits the protocol file 910 to the search server 400. The search server 400 searches material information including this keyword from the material information database 410. This material information is information on a material (materials) closely associated with the object (standard in this case) and referred to when the object is discussed.

At step SL6, the control section 502 determines whether or not the digital document discussion apparatus 500 has received search result information from the search server 400. In this case, the determination result of the step SL6 is assumed as "No" and this determination is repeated.

Then, if the digital document discussion apparatus 500 has received the search result information (material information) corresponding to the keyword from the search server 400, the control section 502 outputs "Yes" as the determination result of the step SL6. At step SL7, the control section 502 controls the discussion participant side client 300$_1$ to display the search result related to the material (materials) referred to when the object (standard in this case) is discussed.

On the other hand, if the determination result of the step SL2 is "No", the control section 502 acquires a keyword for free search designated by the discussion participant at step SL8. Subsequently, after the step SL4, the processing based on the keyword is executed.

If the determination result of the step SK5 shown in FIG. 18 is "No", the control section 502 determines whether or not the discussion participant has designated a drawing at step SK6. If the determination result of this step SK6 is "Yes", the control section 502 executes a drawing display processing for displaying a material (materials) related to the discussion receive target object (drawing in this case) at step SK9.

Figure 20:
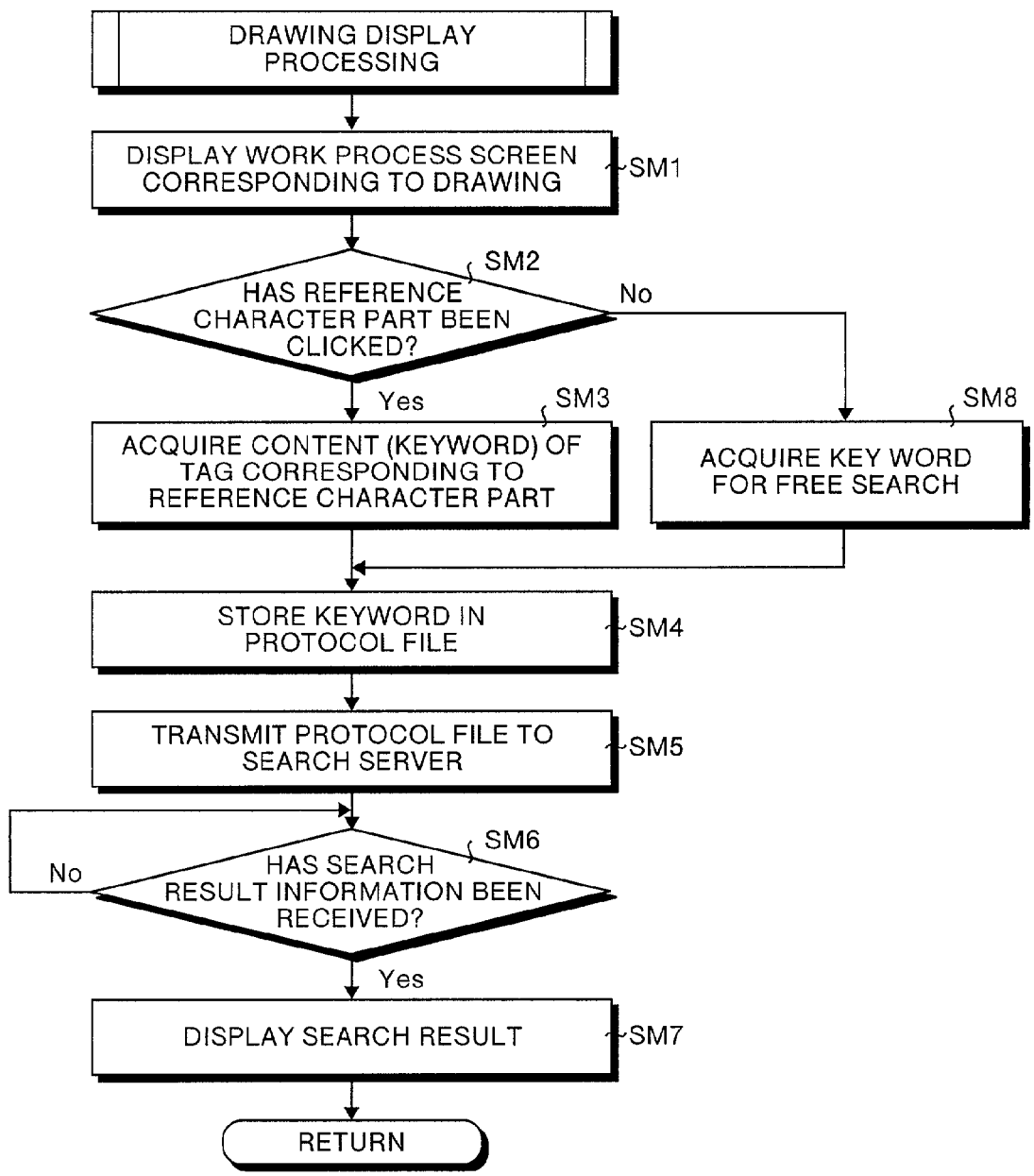
FIG. 20 is a flow chart for describing a drawing display processing shown in FIG. 18.

To be specific, at step SM1 shown in FIG. 20, the control section 502 controls the client of the discussion participant (e.g., the discussion participant side client 300$_1$) to display the work process screen 880. On this work process screen 880, information on the object (drawing in this case) for which the discussion participant has received a discussion request is displayed.

At step SM2, the control section 502 determines whether or not a reference character part on the work process screen 880 (a part of, for example, the design step object list 884) has been clicked. Here, if the discussion participant clicks XXAAA on the design step object list 884, the control section 502 outputs "Yes" as the determination result of the step SM2.

At step SM3, the control section 502 acquires the content (keyword) of a tag corresponding to the character part which has been clicked from the management information database 630. That is, in the step SM3, a keyword is extracted from the XML file corresponding to the discussion receive target object (drawing in this case).

At step SM4, the control section 502 stores the keyword in the protocol file 910 shown in FIG. 38. At step SM5, the control section 502 transmits the protocol file 910 to the search server 400. The search server 400 searches material information including the keyword from the material information database 410. This material information is information on a material (materials) closely associated with the object (drawing in this case) and referred to when the object is discussed.

At step SM6, the control section 502 determines whether or not the digital document discussion apparatus 500 has received search result information (material information) corresponding to the keyword from the search server 400. In this case, the determination result of the step SM6 is assumed as "No" and this determination is repeated.

Then, if the digital document discussion apparatus 500 has received search result information (material information) corresponding to the keyword from the search server 400, the control section 502 outputs "Yes" as the determination result of the step SM6. At step SM7, the control section 502 controls the discussion participant side client 300$_1$ to display a search result, i.e., a search result related to the material (materials) referred to when the object (drawing in this case) is discussed.

On the other hand, if the determination result of the step SM2 is "No", the control section 502 acquires a keyword for free search designated by the discussion participant at step SM8. Subsequently, after the step SM4, the control section 502 executes a processing based on the keyword.

Further, if the determination result of the step SK6 shown in FIG. 18 is "No", i.e., the discussion participant designates a document, the control section 502 executes a document display processing for displaying a material (materials) related to the discussion receive target object (document in this case) at step SK10.

Figure 21:
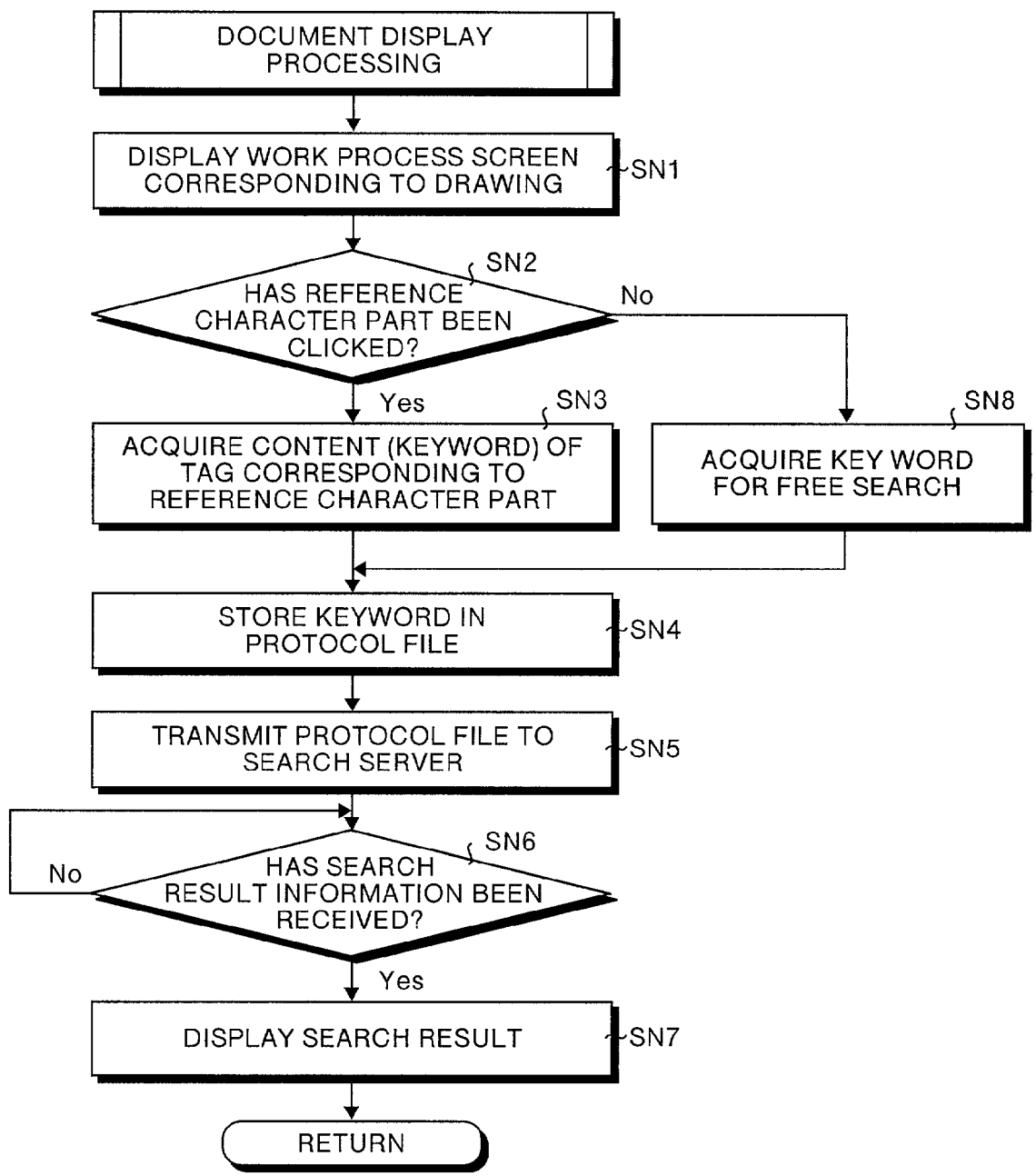
FIG. 21 is a flow chart for describing a document display processing shown in FIG. 18.
Figure 22:
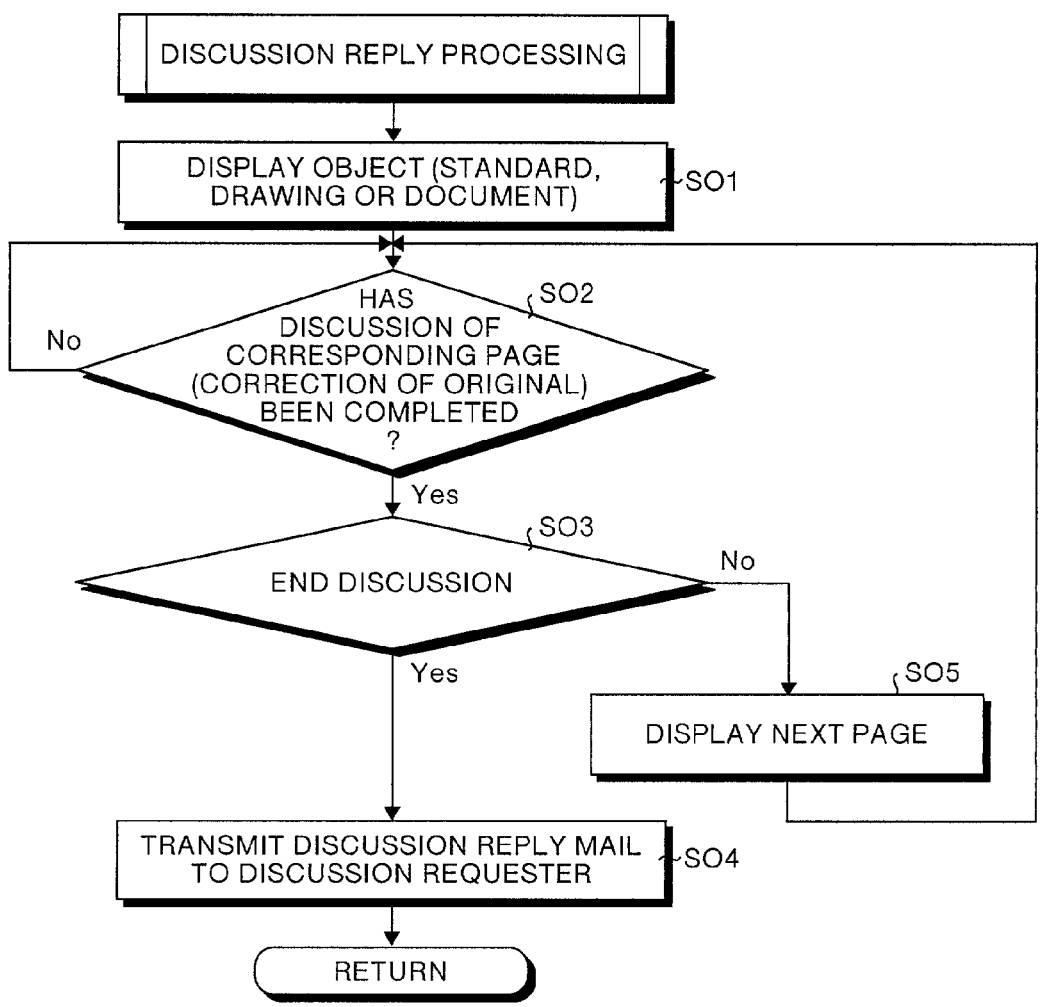
FIG. 22 is a flow chart for describing a discussion replay processing shown in FIG. 18.

To be specific, at step SN1 shown in FIG. 21, the control section 402 controls the client of the discussion participant (e.g., the discussion participant side client 300$_1$) to display the work process screen 880. On this work process screen 880, information on the object (document in this case) for which the discussion participant has received a discussion request is displayed.

At step SN2, the control section 502 determines whether or not a reference character part on the work process screen 880 (a part of, for example, the design step object list 884) has been clicked. Here, if the discussion participant clicks XXAAA on the design step object list 884, the control section 502 outputs "Yes" as the determination result of the step SN2.

At step SN3, the control section 502 acquires the content (keyword) of a tag corresponding to the character part which has been clicked from the management information database 630. That is, in the step SN3, a keyword is extracted from the XML file corresponding to the discussion receive target object (document in this case).

At step SN4, the control section 502 stores the keyword in the protocol file 910 shown in FIG. 38. At step SN5, the control section 502 transmits the protocol file 910 to the search server 400. The search server 400 searches material information including the keyword from the material information database 410. This material information is information on a material (materials) closely associated with the object (document in this case) and referred to when the object is discussed.

At step SN6, the control section 502 determines whether or not the digital document discussion apparatus 500 has received search result information (material information) corresponding to the keyword from the search server 400. In this case, the determination result of the step SN6 is assumed as "No" and this determination is repeated.

Then, if the digital document discussion apparatus 500 has received search result information (material information) corresponding to the keyword from the search server 400, the control section 502 outputs "Yes" as the determination result of the step SN6. At step SN7, the control section 502 controls the discussion participant side client 300$_1$ to display a search result, i.e., a search result related to the material (materials) referred to when the object (document in this case) is discussed.

On the other hand, if the determination result of the step SN2 is "No", the control section 502 acquires a keyword for free search designated by the discussion participant at step SN8. Subsequently, after the step SN4, the control section 502 executes a processing based on the keyword.

Referring back to FIG. 18, at step SK7, the control section 502 executes a discussion reply processing for sending the discussion result of a discussion target object (standard, drawing or document) to a discussion requester. To be specific, at step SO1 shown in FIG. 22, the control section 502 controls the discussion participant side client 300$_1$ to display the page or pages (original) of an object (standard, drawing or document) for which a discussion request has been issued from the discussion requester to the discussion participant. Here, the original to be displayed is, for example, "This design and manufacturing information . . . design efficiency . . . " described in an original row shown in FIG. 39(*a*).

At step SO2, the control section 502 determines whether or not the discussion of the page(s) (correction to the original or the like) has been completed. In this case, the determination result of the step SO2 is assumed as "No" and this determination is repeated.

Figure 39:
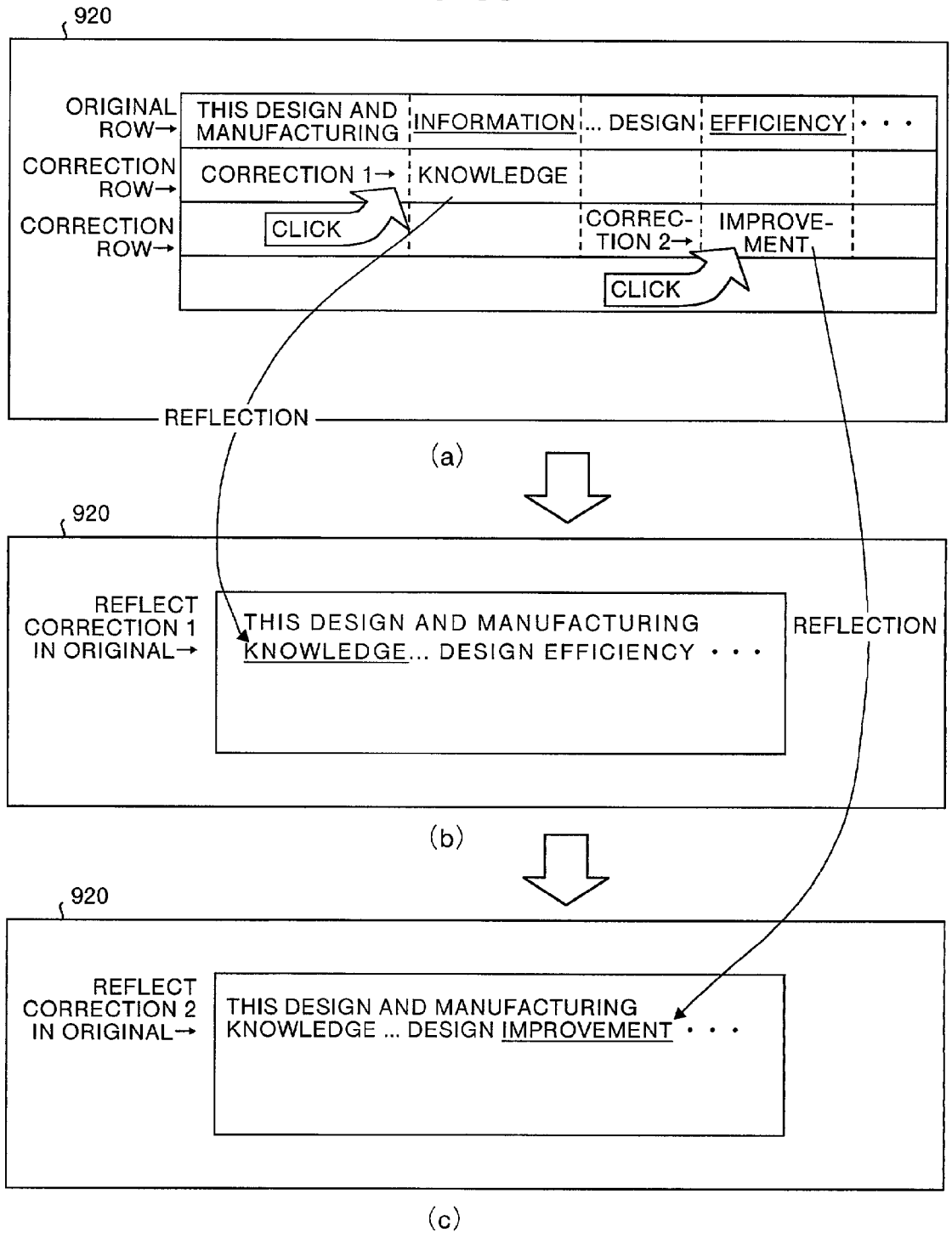
FIG. 39 is an explanatory view for the discussion result processing shown in FIG. 23.

The discussion participant corrects "information" to "knowledge" (correction 1) in the original shown in FIG. 39(*a*) as shown in a correction row. It is noted that other discussion participants requested to discuss the object hold the discussion (make corrections and the like). In correction 2 shown in FIG. 39(*a*), "efficiency" in the original is corrected to "improvement".

If the discussion participant completes with the discussion of the corresponding page, the control section 502 outputs "Yes" as the determination result of the step SO2. At step SO3, the control section 502 determines whether or not the discussion of all pages of the object has been completed. In this case, the determination result of the step SO3 is assumed as "No". At step SO5, the control section 502 controls the discussion participant side client 300$_1$ to display the next page (original) by down-scrolling. Subsequently, the steps SO2, SO3 and SO5 are repeated and the discussion is thereby held.

If the determination result of the step SO3 becomes "Yes", at step SO4, the control section 502 transmits a discussion reply mail representing the content of the above-stated discussion (correction or the like) to the discussion requester (the discussion requester side client 100$_1$ in this case). It is noted that the control section 502 also transmits the discussion reply mail to other discussion requesters.

Next, description will be given to a case where a discussion result (correction or the like) is reflected in the original of an object (standard, drawing or document) after the completion of the discussion. The discussion requester depresses the discussion result processing button shown in FIG. 25. By doing so, the control section 502 outputs "Yes" as the determination result of the step SA7 and executes a discussion result processing at step SA12.

Figure 23:
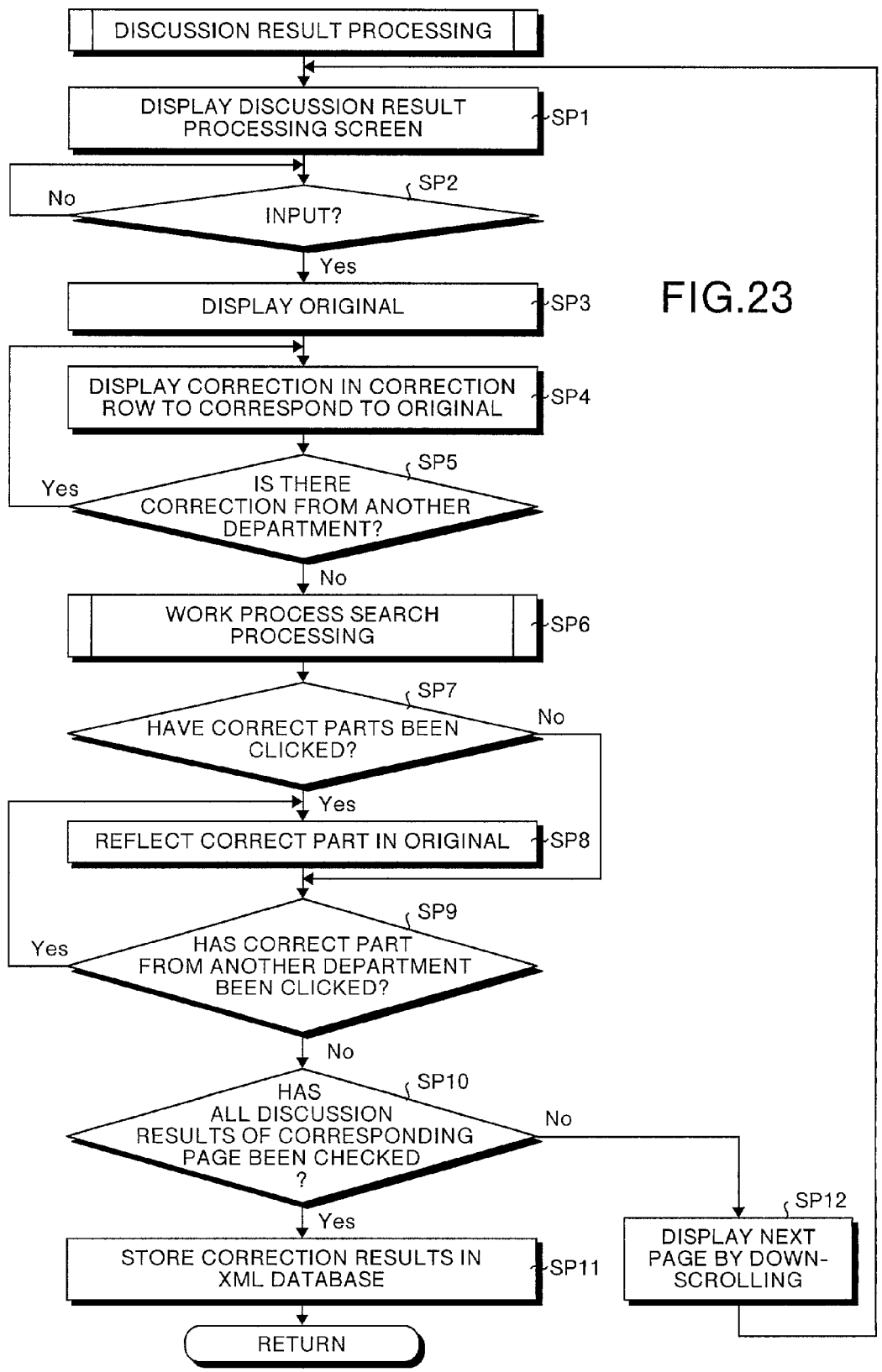
FIG. 23 is a flow chart for describing a discussion result processing shown in FIG. 8.
Figure 29:
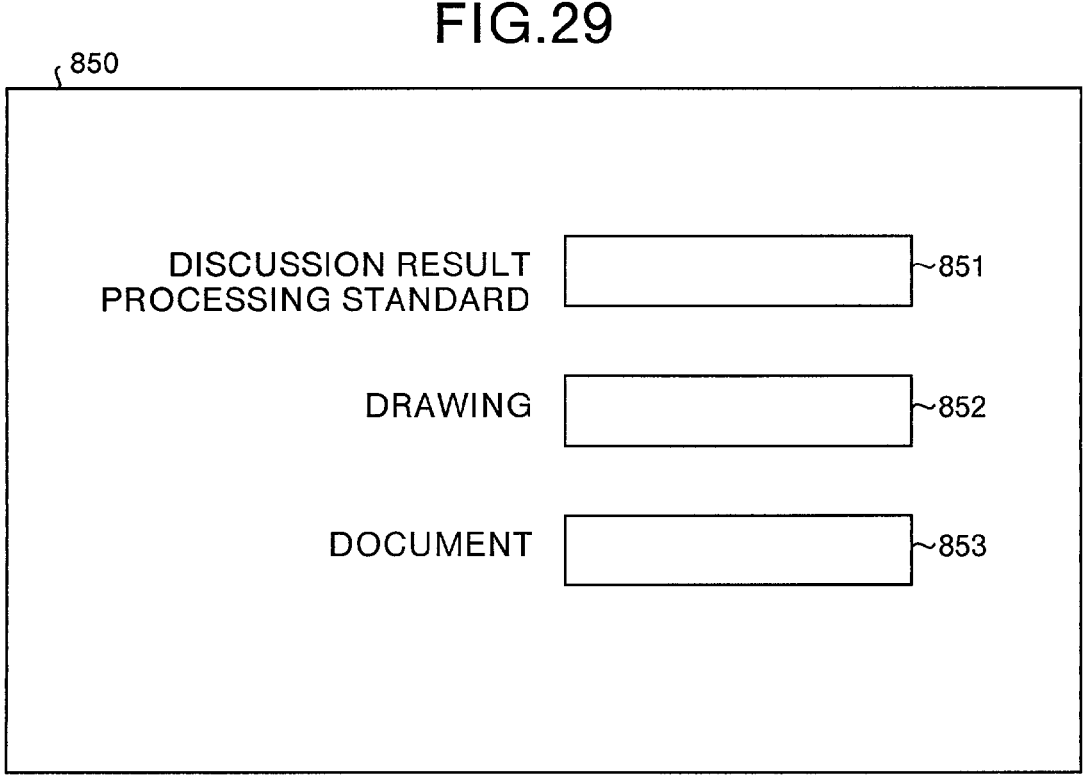
FIG. 29 shows a discussion result processing screen 850 in this embodiment.
Figure 32:
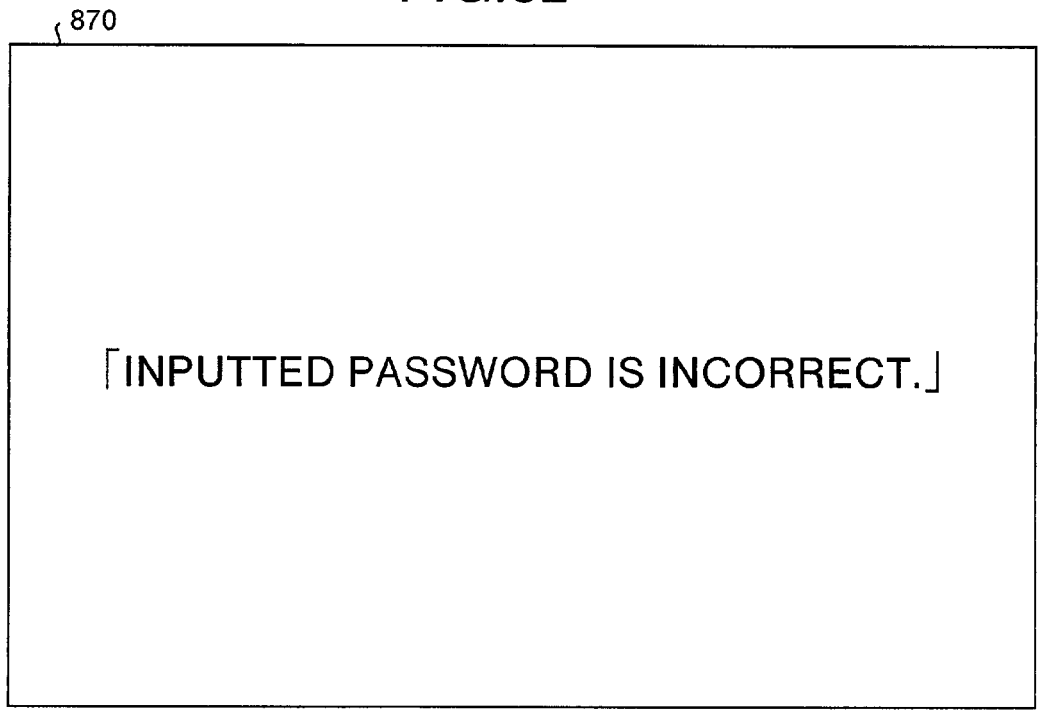
FIG. 32 shows a password error screen 870 in this embodiment.

To be specific, at step SP1 shown in FIG. 23, the control section 502 controls the discussion requester side client 100$_1$ to display a discussion result processing screen 850 shown in FIG. 29. This discussion result processing screen 850 is a screen to be displayed if a discussion result (correction or the like) is reflected in the original of the object (standard, drawing or document).

On this discussion result processing screen 850, a discussion result processing standard designation column 851 is a column for designating a standard as an object for which a discussion result processing is performed. A discussion result processing drawing designation column 852 is a column for designating a drawing as an object for which a discussion result processing is performed. A discussion result processing document designation column 853 is a column for designating a document as an object for which a discussion result processing is performed.

At step SP2, the control section 502 determines whether or not the discussion result processing object has been designated on the discussion result processing screen 850. In this case, the determination result of the step SP2 is assumed as "No" and this determination is repeated. Here, if a discussion participant has designated an object, the control section 502 outputs "Yes" as the determination result of the step SP2.

At step SP3, the control section 502 displays an original corresponding to the object (standard, drawing or document) in an original row on the original reflection screen 920 shown in FIG. 39(a), referring to the XML database. At step SP4, the control section 502 displays a correction (correction 1: "knowledge" in this case) in a correction row to correspond to the original ("information").

At step SP5, the control section 502 determines whether or not there is a correction from the other department. In this case, the determination result of the step SP5 is assumed as "Yes". In the step SP4, the control section 502 displays a correction (correction 2 in this case: "improvement") in a correction row to correspond to the original ("efficiency") in the original row. In the step SP5, the control section 502 determines whether or not there is a correction from the other department and the determination result of this step SP5 is assumed as "No" in this case.

At step SP6, the control section 502 executes the above-stated work process search processing (see FIG. 11). At step SP7, the control section 502 determines whether or not the correction parts shown in FIG. 39(a) have been clicked. If it is assumed that a discussion participant clicks "knowledge" of correction 1, the control section 502 outputs "Yes" as the determination result of the step SP7.

At step SP8, the control section 502 reflects the "knowledge" of correction 1 in the original as shown in FIG. 39(b). At step SP9, the control section 502 determines whether or not the other correction part has been clicked on the original reflection screen 920 shown in FIG. 39(a). Here, if it is assumed that the discussion participant has clicked "improvement" of correction 2, the control section 502 outputs "Yes" as the determination result of the step SP9.

In the step SP8, the control section 502 reflects "improvement" of correction 2 in the original as shown in FIG. 39(c) If the determination result of the step SP9 becomes "No", the control section 502 determines whether or not all the discussion results related to the corresponding page have been checked at step SP10 and outputs "No" as a determination result in this case.

At step SP12, the control section 502 scrawls down the screen to display the next page. Subsequently, corrections are reflected in the original with respect to the following pages. If the determination result of the step SP10 is "Yes", the control section 502 stores correction results (contents of corrections, the original of the corrections and the like) in the XML database 620 while allocating XML tags to phrases (keywords), respectively at step SP11.

As stated so far, according to one embodiment, a template is provided to the discussion requester by a frame with a work process and attribute information (user profile information and responsible organization profile information) corresponding to an object (standard, drawing or document) as a discussion document used as keys, and the request target object is created based on this template. Due to this, it is possible to promptly create the discussion document and issue a discussion request to correspond to the work process.

Further, according to one embodiment, since a plurality of templates corresponding to a plurality of work processes forming a work flow are prepared, respectively, it is possible to select a necessary work process from the work flow and further to provide the template to the discussion requester with this work process and attribute information used as keys.

Also, according to one embodiment, since various items of information, in which the user's situation is reflected based on the attribute information (user profile information, responsible organization profile information) are disclosed for the information disclosure to the user, it is possible to accurately disclose information necessary for the user.

Moreover, according to one embodiment, as shown in FIG. 37, since an object request receiving party is automatically designated by the E-mail address list 900, it is possible to request the object more promptly.

Further, according to one embodiment, since the requested object is allowed to be discussed by the discussion participant according to the work process, it is possible for the discussion participant to promptly discuss the object.

Furthermore, according to one embodiment, since material information designated by the discussion participant is searched from a plurality of items of material information associated with the requested object by the search server 400 and the searched material information is provided to the discussion participant when the object is discussed, it is possible to save labor for searching a material necessary for the discussion and to discuss the object more promptly.

Moreover, according to one embodiment, as described with reference to FIG. 16, since a plurality of items of material information are rearranged in an order of the frequency of use for each work process forming a work flow and the rearranged material information are disclosed to the discussion participant, it is possible to shorten time required for the discussion participant to designate the material.

Figure 15:
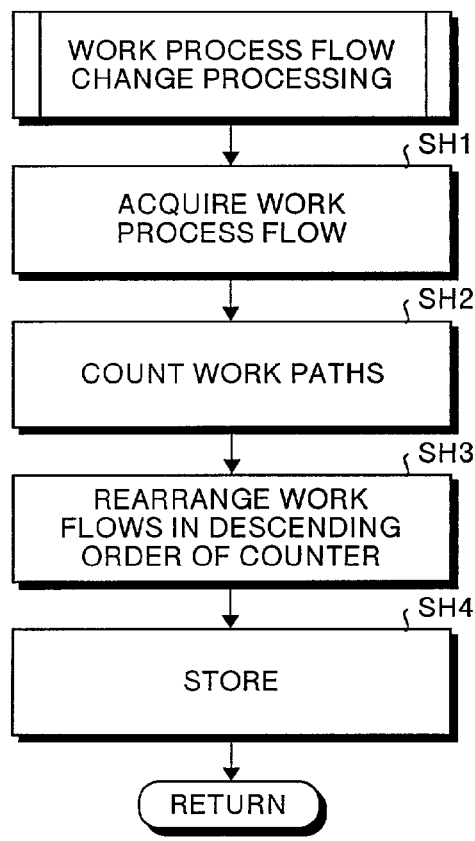
FIG. 15 is a flow chart for describing a work process flow change processing shown in FIG. 11.

Additionally, according to one embodiment, as described with reference to FIG. 15, since the work processes forming the work flow are rearranged in accordance with the frequency of use, it is possible to provide accurate information on the work processes to the discussion participant.

One embodiment according to the present invention has been described in detail so far while referring to the drawings. Concrete configuration examples should not be limited to this embodiment but design changes and the like within the scope of the invention are also included in the present invention.

Figure 40:
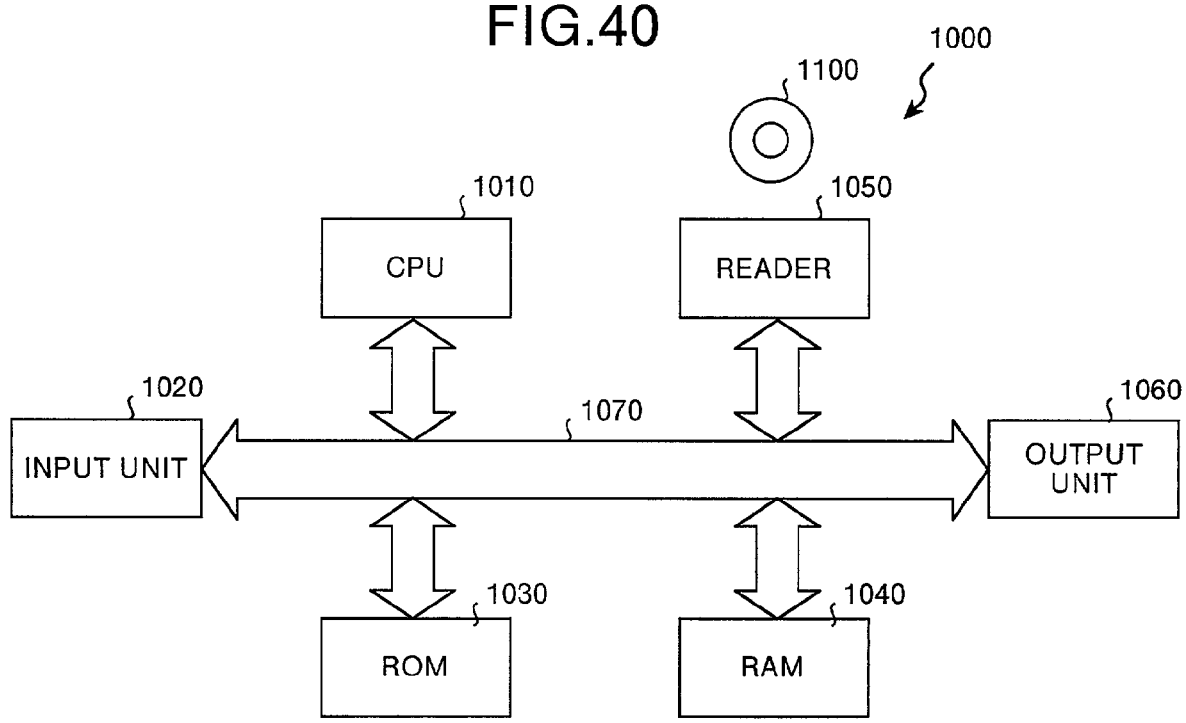
FIG. 40 is a block diagram showing a modification example of this embodiment.
Figure 41:
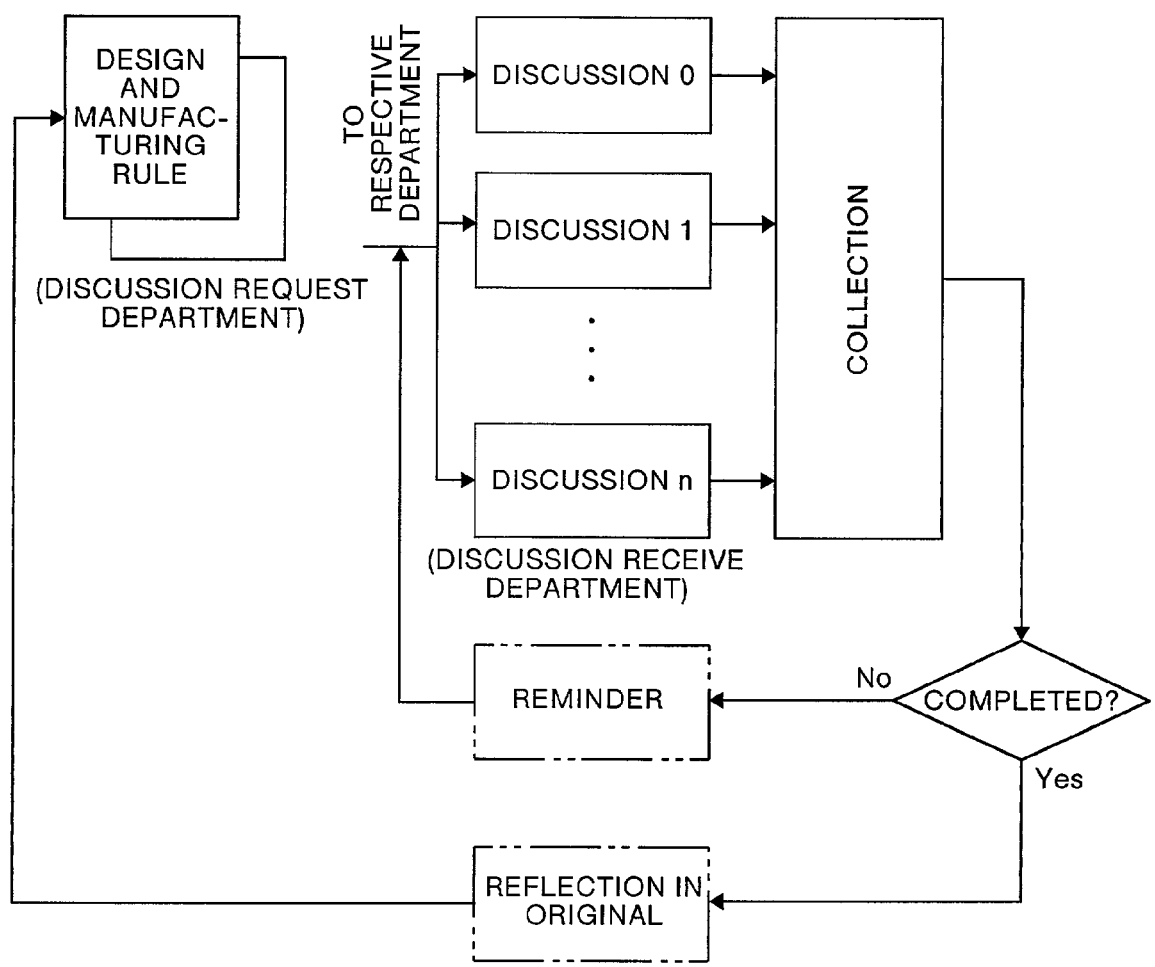
FIG. 41 is an explanatory view for a conventional written document discussion flow.

For example, in the embodiment described above, a program for realizing the functions of the digital document discussion apparatus 500, the discussion requester side clients 100$_1$ to 100$_n$ and/or the discussion participant side clients 300$_1$ to 300$_m$ may be recorded on a computer readable recording medium 200 shown in FIG. 40 and the program recorded on this recording medium 200 may be read and executed by a computer 1000 shown in FIG. 40, thereby realizing the above-stated functions.

The computer 100 consists of a CPU 1010 executing the above-stated program, an input unit 1020 such as a keyboard, a mouse and/or the like, a ROM (Read Access Memory) 1030 storing various data, a RAM (Random Access Memory) 1040 storing operation parameters and the like, a reader 1050 reading the program from the recording medium 200, an output unit 1060 such as a display, a printer and/or the like, and a path 1070 mutually connecting the respective constituent elements of the computer 1000.

The CPU 1010 reads the program recorded on the recording medium 200 through the reader 1050 and then executes the program, thereby realizing the above-stated functions. It is noted that the recording medium 200 not only includes portable type recording mediums such as an optical disk, a floppy disk and a hard disk but also a transmission medium, such as a network, temporarily recording and holding data.

As stated so far, according to the present invention, a template is provided to the discussion requester by a frame with a work process and attribute information corresponding to a discussion document used as keys, and the request target discussion document is created based on this template. Due to this, it is advantageously possible to promptly create the discussion document and issue a discussion request to correspond to the work process.

Further, according to the present invention, since a plurality of templates corresponding to a plurality of work processes forming a work flow are prepared, respectively, it is advantageously possible to select a necessary work process from the work flow and further to provide the template to the discussion requester with this work process and attribute information used as keys.

Also, according to the present invention, since various items of information, in which the user's situation is reflected based on the user attribute information are disclosed for the information disclosure to the user, it is advantageously possible to accurately disclose information necessary for the user.

Moreover, according to the present invention, since discussion document request receiving party is automatically set, it is advantageously possible to request the discussion more promptly.

Further, according to the present invention, since the requested discussion document is allowed to be discussed by the discussion participant according to the work process, it is advantageously possible for the discussion participant to promptly discuss the discussion document.

Furthermore, according to the present invention, since material information designated by the discussion participant is searched from a plurality of items of material information associated with the requested discussion document and the searched material information is provided to the discussion participant when the object is discussed, it is advantageously possible to save labor for searching a material necessary for the discussion and to discuss the object more promptly.

Moreover, according to the present invention, since a plurality of items of material information are rearranged in an order of the frequency of use for each work process forming a work flow and the rearranged material information are disclosed to the discussion participant, it is advantageously possible to shorten time required for the discussion participant to designate the material.

Additionally, according to the present invention, since the work processes forming the work flow are rearranged in accordance with the frequency of use, it is advantageously possible to provide accurate information on the work processes to the discussion participant.

According to the present invention, the template is provided to the discussion requester by the frame with the work process and the attribute information corresponding to the discussion document used as keys, and the discussion document for which a request is issued is created based on this template. Due to this, it is advantageously possible to promptly create the discussion document and to issue the request to correspond to the work process. Further, since the searched material information is provided to the discussion participant when discussing the discussion document, it is advantageously possible to save labor for searching a material necessary for a discussion and to discuss the discussion document more promptly.

According to the present invention, the template is provided to the discussion requester by the frame with the work process and the attribute information corresponding to the discussion document used as keys, and the discussion document for which a request is issued is created based on this template. Due to this, it is advantageously possible to promptly create the discussion document and to issue the request to correspond to the work process. Further, since material information designated by the discussion participant from a plurality of items of material information associated with the discussion document is provided to the discussion participant when discussing the discussion document, it is advantageously possible to save labor for searching a material necessary for a discussion and to discuss the discussion document more promptly.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A computer-implemented digital document discussion method, comprising:

storing a digitized document including a plurality of templates corresponding to documents in a document database;

storing attribute information on a user including a discussion requester and a discussion participant in an attribute information database;

providing a template corresponding to a document to be discussed out of the templates stored in the document database to a first client at the discussion requester based on a work process relating to the document and the attribute information;

creating a discussion document based on the template at the first client;

accumulating a plurality of items of material information;

transmitting a discussion request with the discussion document from the first client to a second client at a discussion participant requesting the discussion participant to discuss the discussion document transmitted and displayed at the second client;

searching material information associated with the discussion document from the plurality of items of material information; and providing the material information searched in the searching to the discussion participant when discussing the discussion document.

2. A computer-implemented digital document discussion method comprising:

storing a digitized document including a plurality of templates corresponding to documents in a document database;

storing attribute information on a user including a discussion requester and a discussion participant in an attribute information database;

providing a template corresponding to a document to be discussed out of the templates stored in the document database to a first client at the discussion requester based on a work process relating to the document and the attribute information;

creating a discussion document based on the template;

transmitting a discussion request with the discussion document from the client to a second client at a discussion participant requesting the discussion participant to discuss the discussion document transmitted and displayed at the second client;

searching material information designated by the discussion participant from a plurality of items of material information associated with the discussion document requested in the discussion request;

providing the material information to the discussion participant when discussing the discussion document; and allowing the discussion participant to discuss the discussion document displayed at the second client.

3. A computer-readable medium storing instructions, which when executed by a computer, causes the computer to function as:

a document storage unit which stores a digitized document including a plurality of templates corresponding to documents in a document database;

an attribute information storage unit which stores attribute information on a user including a discussion requester and a discussion participant in an attribute information database;

a template providing unit which provides a template to corresponding to a document to be discussed out of the templates stored in the document database to a first client at the discussion requester based on a work process relating to the document and the attribute information;

a discussion document creation unit which creates a discussion document based on the template at the first client;

a material information accumulation unit which accumulates a plurality of items of material information;

a discussion request unit which transmits a discussion request with the discussion document from the first client to a second client at a discussion participant requesting the discussion participant to discuss the discussion document transmitted and displayed at the second client;

a search unit which searches material information associated with the discussion document from the plurality of items of material information; and a material information providing unit which provides the material information searched in the search unit to the discussion participant when discussing the discussion document.

4. A computer-readable medium storing instructions, which when executed by a computer, causes the computer to function as:

a document storage unit which stores a digitized document including a plurality of templates corresponding to documents in a document database;

an attribute information storage unit which stores attribute information on a user including a discussion requester and a discussion participant in an attribute information database;

a template providing unit which provides a template corresponding to a document to be discussed out of the templates stored in the document database to a first client at the discussion requester based on a work process relating to the document and the attribute information;

a discussion document creation unit which creates a discussion document based on the template at the first client;

a discussion request unit which transmits a discussion request with the discussion document from the first client to a second client a discussion participant requesting the discussion participant to discuss the discussion document transmitted and displayed at the second client;

a search unit which searches material information designated by the discussion participant from a plurality of items of material information associated with the discussion document from the plurality of items of material information; and a material information providing unit which provides the material information searched in the search step to the discussion participant when discussing the discussion document; and a discussion unit which allows the discussion participant to discuss the discussion document displayed at the second client.

* * * * *